(12) United States Patent
Kato

(10) Patent No.: US 8,795,922 B2
(45) Date of Patent: Aug. 5, 2014

(54) CELL FOR FUEL CELL AND FUEL CELL

(75) Inventor: Chisato Kato, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1043 days.

(21) Appl. No.: 12/672,748

(22) PCT Filed: Aug. 6, 2008

(86) PCT No.: PCT/JP2008/064502
§ 371 (c)(1),
(2), (4) Date: Feb. 9, 2010

(87) PCT Pub. No.: WO2009/028331
PCT Pub. Date: Mar. 5, 2009

(65) Prior Publication Data
US 2011/0311897 A1    Dec. 22, 2011

(30) Foreign Application Priority Data

Aug. 10, 2007 (JP) .................. 2007-209062
Dec. 6, 2007 (JP) .................. 2007-315737

(51) Int. Cl.
*H01M 8/10* (2006.01)
*H01M 8/24* (2006.01)
*H01M 8/02* (2006.01)

(52) U.S. Cl.
CPC ..................... *H01M 8/02* (2013.01)
USPC ................ 429/480; 429/479; 429/400

(58) Field of Classification Search
CPC .................. H01M 8/02; H01M 8/10
USPC ............................ 428/480; 429/480
See application file for complete search history.

(56) References Cited

U.S. PATENT DOCUMENTS

| 6,057,054 A | 5/2000 | Barton et al. |
| 6,066,409 A | 5/2000 | Ronne et al. |

(Continued)

FOREIGN PATENT DOCUMENTS

| EP | 1 391 956 | 2/2004 |
| EP | 1 403 949 | 3/2004 |
| JP | 2001-510932 | 8/2001 |
| JP | 2005-158299 | 6/2005 |
| JP | 2006-236957 | 9/2006 |
| JP | 2008-243799 | 10/2006 |
| JP | 2007-26812 | 2/2007 |
| JP | 2007-42348 | 2/2007 |

(Continued)

OTHER PUBLICATIONS

Notification of Transmittal of Translation of the International Preliminary Report on Patentability, dated Mar. 18, 2010, for PCT/JP2008-064502.

*Primary Examiner* — Barbara Gilliam
*Assistant Examiner* — Gary Harris
(74) *Attorney, Agent, or Firm* — Finnegan, Henderson, Farabow, Garrett & Dunner, LLP

(57) ABSTRACT

A cell for a fuel cell, having an electric power generation region in which an assembly 12 and first and second gas diffusion layers 14 are laminated to enable electric power generation, and a manifold region which is formed at the periphery of the electric power generation region and in which manifold openings 18 are formed to allow the passage of a gas or the like, wherein one of the first and second gas diffusion layers 14 extends to the manifold region, and a peripheral edge portion 14c is hermetically sealed by impregnation with a liquid resin that is used for forming a gasket 16 around the periphery of the manifold opening 18. The porosity of a boundary portion 14b of the first and second gas diffusion layers 14 is smaller than the porosity of the electric power generation region 14a and the peripheral edge portion 14c.

9 Claims, 20 Drawing Sheets

(56) References Cited

U.S. PATENT DOCUMENTS

| | | |
|---|---|---|
| 6,190,793 B1 | 2/2001 | Barton et al. |
| 2004/0137303 A1 | 7/2004 | Kuroki et al. |
| 2005/0244702 A1* | 11/2005 | Horiguchi ............ 429/34 |
| 2006/0078784 A1* | 4/2006 | Liu et al. ............. 429/42 |
| 2007/0196717 A1* | 8/2007 | Kuroki et al. ......... 429/35 |
| 2010/0167171 A1* | 7/2010 | Sasaoka ............. 429/508 |

FOREIGN PATENT DOCUMENTS

| | | |
|---|---|---|
| JP | 2007042348 A * | 2/2007 |
| JP | 2008-218304 | 9/2008 |
| JP | 2008243799 A * | 10/2008 |
| WO | WO 02/089240 A1 | 11/2002 |
| WO | WO 2007080518 A1 * | 7/2007 |
| WO | WO 2008/111468 A1 | 9/2008 |

* cited by examiner

HEXAGONAL SHAPE

CELL FOR FUEL CELL AND FUEL CELL

CROSS-REFERENCE TO RELATED APPLICATIONS

This application is a national phase application of International Application No. PCT/JP2008/064502, filed Aug. 6, 2008, and claims the priority of Japanese Application Nos. 2007-209062, filed Aug. 10, 2007 and 2007-315737, filed Dec. 6, 2007, the contents of all of which are incorporated herein by reference.

TECHNICAL FIELD

The present invention relates to a cell for a fuel cell and a fuel cell, and relates more particularly to a cell for a fuel cell and a fuel cell in which a manifold opening is hermetically sealed while suppressing liquid resin impregnation of the electric power generation region, and in which cross-leaks and short-circuits between first and second gas diffusion members at the anode and cathode can be prevented while still enabling a very thin laminated thickness.

BACKGROUND ART

As shown in FIG. 19, in a solid polymer fuel cell, a membrane electrode assembly (MEA) comprising an electrolyte membrane 92 formed from a solid polymer film sandwiched between two electrodes, namely a fuel electrode 96 and an air electrode 94, is itself sandwiched between two separators 90 to generate a cell that functions as the smallest unit, and a plurality of these unit cells are then usually stacked to form a fuel cell stack (FC stack), enabling a high voltage to be obtained.

The mechanism for electric power generation by a solid polymer fuel cell generally involves the supply of a fuel gas such as a hydrogen-containing gas to the fuel electrode (the anode side electrode) 96, and supply of an oxidizing gas such as a gas comprising mainly oxygen ($O_2$) or air to the air electrode (the cathode side electrode) 94. The hydrogen-containing gas is supplied to the fuel electrode 96 through fuel gas passages, and the action of the electrode catalyst causes the hydrogen to dissociate into electrons and hydrogen ions ($H^+$). The electrons flow through an external circuit from the fuel electrode 96 to the air electrode 94, thereby generating an electrical current. Meanwhile, the hydrogen ions ($H^+$) pass through the electrolyte membrane 92 to the air electrode 94, and bond with oxygen and the electrons that have passed through the external circuit, thereby generating reaction water ($H_2O$). The heat that is generated at the same time as the bonding reaction between hydrogen ($H_2$), oxygen ($O_2$) and the electrons is recovered using cooling water.

In recent years, fuel cell structural members in which the membrane electrode assembly and gas diffusion layers are molded as a single integrated unit have been proposed to enable unit cells to be constructed with a minimal number of components (for example, see Patent Document 1). As illustrated in FIG. 20, this type of fuel cell structural member comprises an MEA composed of an electrolyte membrane 1 and gas diffusion layers 2 and 3 integrally molded to the two sides of the electrolyte membrane 1 with catalyst-supporting layers 2a and 3a that constitute the electrodes disposed therebetween, and further comprises impregnated band portions 2b and 3b formed from a liquid rubber or synthetic resin which extend inwards for a predetermined width from the peripheral edges of the gas diffusion layers 2 and 3, and a gasket 4 formed from an elastic material is integrally molded so as to totally cover the outer surfaces of the impregnated band portions 2b and 3b.

Further, as illustrated in FIG. 21, a membrane electrode assembly disclosed in Patent Document 2 comprises reinforcing layers 5 provided on both surfaces of an electrolyte membrane 1, wherein catalyst layers 2a and 3a are each laminated to a portion of the respective reinforcing layer 5, and gas diffusion layers 2 and 3 are then laminated thereon. On the other hand, in a manifold opening 11 of the membrane electrode assembly, the reinforcing layers 5 are provided on both surfaces of the electrolyte membrane 1, an adhesive layer 8, a spacer layer 6 and an impregnated portion 7 are laminated to each reinforcing layer 5, and a sealing portion 9 is formed on the surface of each impregnated portion 7 both inside and outside the manifold opening 11 in the in-plane direction. Accordingly, as illustrated in FIG. 21, by forming the adhesive layers 8 and the spacer layers 6 around the outer periphery of the membrane electrode assembly, extending the outer peripheral portions of the gas diffusion layers 2 and 3 of the anode and cathode respectively through to the manifold region, and then forming the impregnated portions 7 by impregnating these outer peripheral portions of the gas diffusion layers with a sealing material, a membrane electrode assembly can be provided in which the gas diffusion layers can be prevented from biting into the assembly under the compressive stress generated during molding, enabling damage to the electrolyte membrane to be suppressed.

Patent Document 1: JP 2006-236957 A
Patent Document 2: JP 2007-42348 A

DISCLOSURE OF INVENTION

Problems to be Solved by the Invention

However, if the gas diffusion layers are simply extended into the manifold region, and the peripheral edges of the extended gas diffusion layers are then impregnated with a resin or sealing material, then there is still a possibility of a deterioration in the gas sealing properties if a reliable impregnation of the resin or sealing material is not achieved. On the other hand, if the resin or sealing material penetrates through to the electric power generation region of the gas diffusion layers, then there is a possibility that the gas supply surface area that supplies gas to the assembly within the electric power generation region may decrease, resulting in a reduction in the electric power generation efficiency of the fuel cell. Furthermore, because the structure of the unit cell proposed in Patent Document 2 includes the adhesive layers and spacer layers, the number of components per unit cell increases, and because the unit cell is a multilayer laminated structure, the thickness of the cell tends to increase, which increases the possibility of an increase in size of a fuel cell formed by stacking a plurality of cells.

Means to Solve the Problems

The present invention has been developed to address the problems outlined above, and provides a cell for a fuel cell and a fuel cell in which the number of components within a unit cell can be reduced, the gas sealing properties can be improved, and the size of the cell can be reduced.

In order to achieve these effects, a cell for a fuel cell and a fuel cell according to the present invention have the features described below.

(1) A cell for a fuel cell comprising an assembly having a fuel electrode and an air electrode provided on an electrolyte membrane, a first gas diffusion member that supplies a fuel gas to the fuel electrode, a second gas diffusion member that supplies an oxidizing gas to the air electrode, and a pair of separators that sandwich the first gas diffusion member, the assembly and the second gas diffusion member, wherein the cell for a fuel cell contains an electric power generation region in which the assembly is positioned, and a manifold region, which is provided at the periphery of the electric power generation region, and in which manifold openings are formed to allow the passage of a fuel gas, an oxidizing gas and a coolant medium, at least one of the first gas diffusion member and the second gas diffusion member extends to the manifold region and is hermetically sealed by impregnation with a liquid resin, and the porosity of boundary portions between the electric power generation region and the manifold region in the first gas diffusion member and the second gas diffusion member is relatively small, at least when compared with the porosities of the electric power generation region and the manifold region within the first gas diffusion member and the second gas diffusion member.

Because the boundary portions in the first gas diffusion member and the second gas diffusion member have a porosity that is not only suitable for preventing the impregnating liquid resin from penetrating into the electric power generation region, but also inhibits the passage of gases, favorable gas sealing properties can be ensured within the manifold region, the gas diffusion surface area within the electric power generation region can be maintained, and the gas diffusion properties within the electric power generation region can be improved.

(2) The cell for a fuel cell disclosed in (1) above, wherein either one of the first gas diffusion member and the second gas diffusion member extends to the manifold region and is hermetically sealed by impregnation with a liquid resin.

By extending either one of the first gas diffusion member and the second gas diffusion member to the manifold region, gas leaks and short-circuits between the anode and the cathode in the manifold region can be prevented. Because the liquid resin is impregnated into the extended gas diffusion member, mechanical bonding and improved gas sealing properties can be achieved even without the type of adhesive layer used in Patent Document 2.

(3) The cell for a fuel cell disclosed in (1) or (2) above, wherein the porosity of the boundary portions between the electric power generation region and the manifold region in the first gas diffusion member and the second gas diffusion member is smaller than the porosity of the manifold region within the first gas diffusion member and the second gas diffusion member.

By using the above structure, the liquid resin can be prevented from penetrating through to the electric power generation region of the first and second gas diffusion members.

(4) The cell for a fuel cell disclosed in any one of (1) to (3) above, wherein the assembly extends to the manifold region and is bonded to a liquid resin that forms a hermetic seal.

Because the assembly generally exhibits a high degree of affinity with the liquid resin used for hermetically sealing the manifold region, by bonding the assembly that extends to the manifold region with the liquid resin that hermetically seals the manifold region, the bonding reliability of the cell for a fuel cell can be further improved. Accordingly, the cell for a fuel cell can be bonded in a more mechanical manner and the gas sealing properties can be improved even without the type of adhesive layer used in Patent Document 2.

(5) The cell for a fuel cell disclosed in any one of (1) to (4) above, wherein the first gas diffusion member and the second gas diffusion member are gas diffusion layers provided on the fuel electrode and the air electrode respectively.

The number of components within the unit cell can be reduced, and the gas sealing properties within the manifold region can be improved.

(6) The cell for a fuel cell disclosed in any one of (1) to (4) above, wherein the separators are flat separators in which the surface that faces the assembly is a flat surface, and the first gas diffusion member and second gas diffusion member are porous passage layers that are disposed between the flat separators and gas diffusion layers provided on the fuel electrode and the air electrode respectively.

The porous passage layers are made of metal, and are therefore impregnated with the liquid resin more readily than the gas diffusion layers in the manifold region, thus improving the strength of the manifold region, particularly during heating. As a result, deformation of the manifold region due to applied pressure or gas pressure generated during molding is suppressed, enabling a further improvement in the gas sealing properties.

(7) The cell for a fuel cell disclosed in any one of (1) to (6) above, wherein the pore size within the boundary portions of the first gas diffusion member and the second gas diffusion member is not more than 20 μm.

In a cell for a fuel cell, the pore size at which flow of a liquid resin becomes impossible is generally considered to be 20 μm or smaller, and therefore by ensuring that the pore size within the boundary portions of the first gas diffusion member and the second gas diffusion member is not more than 20 μm, impregnation of the boundary portions with the liquid resin can be inhibited, which enables more favorable molding processability.

(8) The cell for a fuel cell disclosed in (6) above, wherein the porous passage layers are formed from a lath cut metal or expanded metal that has different porosities within the electric power generation region, the manifold region, and the boundary portion between the electric power generation region and the manifold region.

The lath cut metal or expanded metal can be processed so that the porosity varies as desired, and the metal can also be formed with a desired thickness. Furthermore, being a metal, the lath cut metal or expanded metal can also function as a current collector.

(9) The cell for a fuel cell disclosed in any one of (1) to (8) above, wherein within the manifold region, the first gas diffusion member, the assembly, and the second gas diffusion member are integrated into a single unit, a gasket is provided that hermetically seals the periphery of the manifold opening, and the peripheral edge portion of either one of the first gas diffusion member and the second gas diffusion member that has been extended into the manifold region is positioned centrally across the thickness direction of the gasket.

By positioning the peripheral edge portion of either one of the first gas diffusion member and the second gas diffusion member in the center across the thickness direction of the gasket, the reactive force generated by the resin that forms the gasket is able to act uniformly against the pressure that is applied from above and below the gasket when a plurality of the unit cells are stacked together, meaning distortion of the gasket due to the applied pressure can be suppressed. As a result, the gas sealing properties of a fuel cell prepared by stacking the unit cells can be further improved.

(10) A fuel cell prepared by stacking cells for a fuel cell disclosed in any one of (1) to (9) above.

Because cells having a reduced number of components are stacked together, the fuel cell can be reduced in size. Moreover, the gas sealing properties can be improved, and the electric power generation efficiency for each cell of the fuel cell can be improved.

Effect of the Invention

According to the present invention, the number of components within a unit cell can be reduced, the gas sealing properties can be improved, and the electric power generation efficiency for each cell of the fuel cell can be improved.

Figure 1:
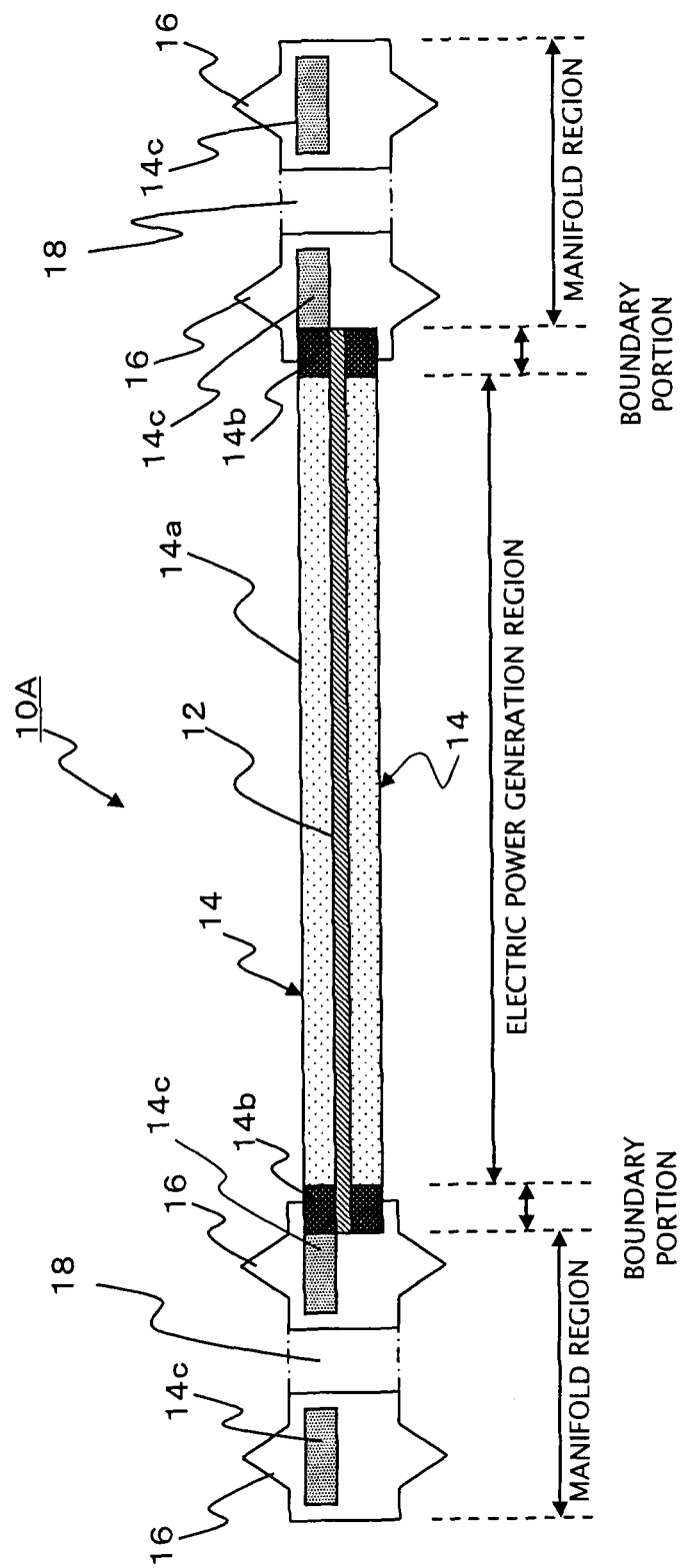
FIG. 1 is a cross-sectional view describing one example of the structure of a membrane electrode assembly in a cell for a fuel cell according to the present invention.

DESCRIPTION OF THE REFERENCE SYMBOLS 10A, 10B, 10C, 10D, 20A, 20B, 20C, 20D, 30 and 40 Membrane electrode assembly
12 Assembly
14 Gas diffusion layer
14a, 24a Electric power generation region
14b, 24b Boundary portion
14c, 24c Peripheral edge portion
16 Gasket
18 Manifold opening
24, 24A, 24B Porous passage layer

BEST MODE FOR CARRYING OUT THE INVENTION

Embodiments of the present invention are described below with reference to the drawings.

First Embodiment

As illustrated in FIG. 1, a cell for a fuel cell (hereafter also referred to as a "unit cell") according to the present embodiment comprises a membrane electrode assembly 10A, composed of an assembly 12 having a fuel electrode and an air electrode on an electrolyte membrane, and first and second gas diffusion layers 14 that supply a fuel gas and an oxidizing gas to the fuel electrode and air electrode respectively of the assembly 12, wherein the membrane electrode assembly 10A is sandwiched between a pair of separators (not shown in the figure) described below. In this embodiment, the gas diffusion layers represent the first and second gas diffusion members of the present invention.

Moreover, the cell for a fuel cell according to the present embodiment includes an electric power generation region capable of generating electric power in which the assembly 12 and the first and second gas diffusion layers 14 are laminated together, and a manifold region, which is provided at the periphery of the electric power generation region and in which are provided manifold openings 18 that allow circulation of the fuel gas, the oxidizing gas and a coolant medium, wherein either one of the first and second gas diffusion layers 14 extends into the manifold region, and peripheral edge portions 14c of the extended gas diffusion layer 14 are hermetically sealed by impregnation with a liquid resin. In addition, a gasket 16 having elasticity and formed by curing a liquid resin is formed around the periphery of each manifold opening 18, and the peripheral edge portion 14c also functions as the core material for the gasket 16.

In the cell for a fuel cell of the present embodiment, the porosity of boundary portions 14b between the electric power generation region and the manifold region in the first and second gas diffusion layers 14 is relatively small, at least when compared with the porosity of the electric power generation region 14a within the first and second gas diffusion layers 14 and the porosity of the peripheral edge portion 14c in the manifold region. Moreover, the porosity of the boundary portions 14b within the first and second gas diffusion layers 14 is preferably smaller than the porosity of the peripheral edge portion 14c in the manifold region of the first or second gas diffusion layer 14. In a more preferred configuration, the pore size within the boundary portions 14b between the electric power generation region and the manifold region in the first and second gas diffusion layers 14 is a pore size at which flow of a liquid resin becomes impossible, and is typically not more than 20 μm. This enables the boundary portions 14b to prevent the liquid resin that is impregnated into the gas diffusion layer to form the manifold region from penetrating into the electric power generation region.

Furthermore, in terms of the pore size in the electric power generation region 14a of the first and second gas diffusion layers 14, a pore size is selected that exceeds 20 μm and is capable of providing favorable gas circulation. The pore size of the peripheral edge portions 14c of the first or second gas diffusion layer 14 is also selected as a pore size exceeding 20 μm, so as to enable impregnation with the liquid resin used for forming the manifold.

Examples of materials that can be used as the electrolyte membrane in the above assembly include fluorine-based membranes such as Nafion (a registered trademark, manufactured by DuPont Corporation) and hydrocarbon-based membranes (HC membranes). Furthermore, the fuel electrode and the air electrode are prepared by supporting an electrode catalyst on a carbon-based carrier. Examples of the electrode catalyst include catalysts formed from platinum or a platinum-containing alloy, and examples of the other metal within the platinum-containing alloy or metals that may be included within the catalyst together with platinum include iron, cobalt, nickel, chromium, copper and vanadium. This electrode catalyst is supported on a carbon-based carrier.

Examples of materials that may be used as the first and second gas diffusion layers 14 include papers, cloths, high-cushion papers, and porous metals. Further, carbon particle layers composed of carbon particle aggregates that exhibit water repellency may also be used. Examples of these carbon particles include carbon black, graphite, and expanded graphite, although carbon blacks such as oil furnace black, channel black, lamp black, thermal black and acetylene black, which have superior electron conductivity and a large specific surface area, can be used particularly favorably. Furthermore, in order to prevent the flatting phenomenon and the like from occurring within the fuel cell, a water repellent agent is typically added to the first and second gas diffusion layers 14, and examples of this water repellent agent include fluorine-based polymer materials such as polytetrafluoroethylene (PTFE), polyvinylidene fluoride (PVDF), polyhexafluoropropylene and copolymers of tetrafluoroethylene and hexafluoropropylene (FEP), as well as polypropylene and polyethylene.

Examples of the liquid resin used for forming the aforementioned gaskets 16 include thermosetting silicon-based resins and thermoplastic resins.

In the present embodiment, in the peripheral edge portions 14c of the first or second gas diffusion layer 14 that extends into the manifold region, the water repellent agent need not be added, meaning the pore size can be maintained and the affinity with the impregnated liquid resin can be improved.

Second Embodiment

Figure 2:
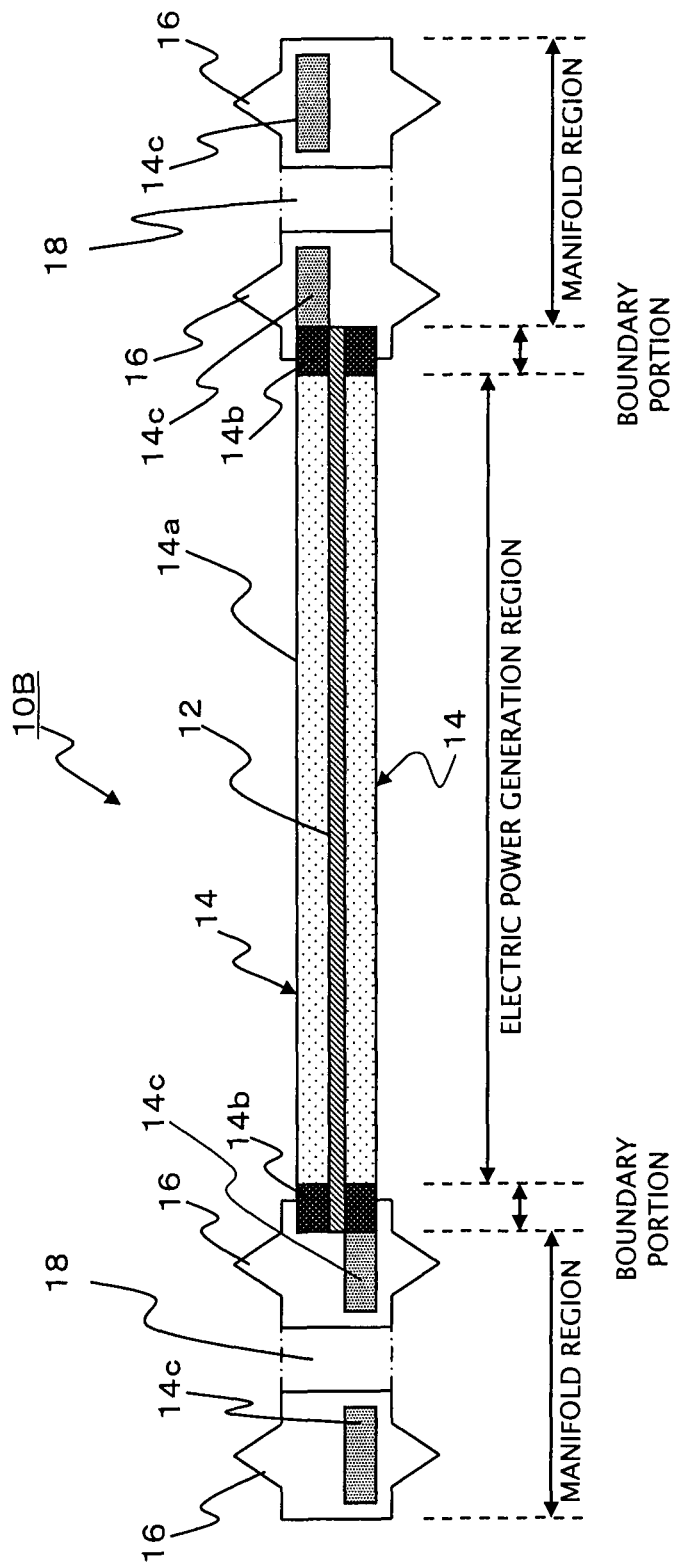
FIG. 2 is a cross-sectional view describing another example of the structure of a membrane electrode assembly in a cell for a fuel cell according to the present invention.

FIG. 2 illustrates the structure of a membrane electrode assembly 10B of a cell for a fuel cell according to a second embodiment. The structure of this membrane electrode assembly 10B of the second embodiment is the same as that of the membrane electrode assembly 10A of the first embodiment illustrated in FIG. 1, with the exception that whereas in the membrane electrode assembly 10A of the first embodiment, only the end portions of one of the gas diffusion layers 14 were extended into the manifold region, in the membrane electrode assembly 10B of the second embodiment, one end portion of both the first and second gas diffusion layers 14 extends into the manifold region, and the peripheral edge portions 14c of the first and second gas diffusion layers 14 are formed so as not to overlap.

In the first and second embodiments, the extended peripheral edge portions 14c of the first and second gas diffusion layers 14 are formed so as not to overlap, but in those cases where the electrolyte membrane is also extended in a similar manner, or a film (not shown in the figures) is disposed between the two gas diffusion layers to ensure reliable electrical insulation, the peripheral edge portions 14c of the two gas diffusion layers 14 may be formed in an overlapping arrangement.

Third Embodiment

Figure 3:
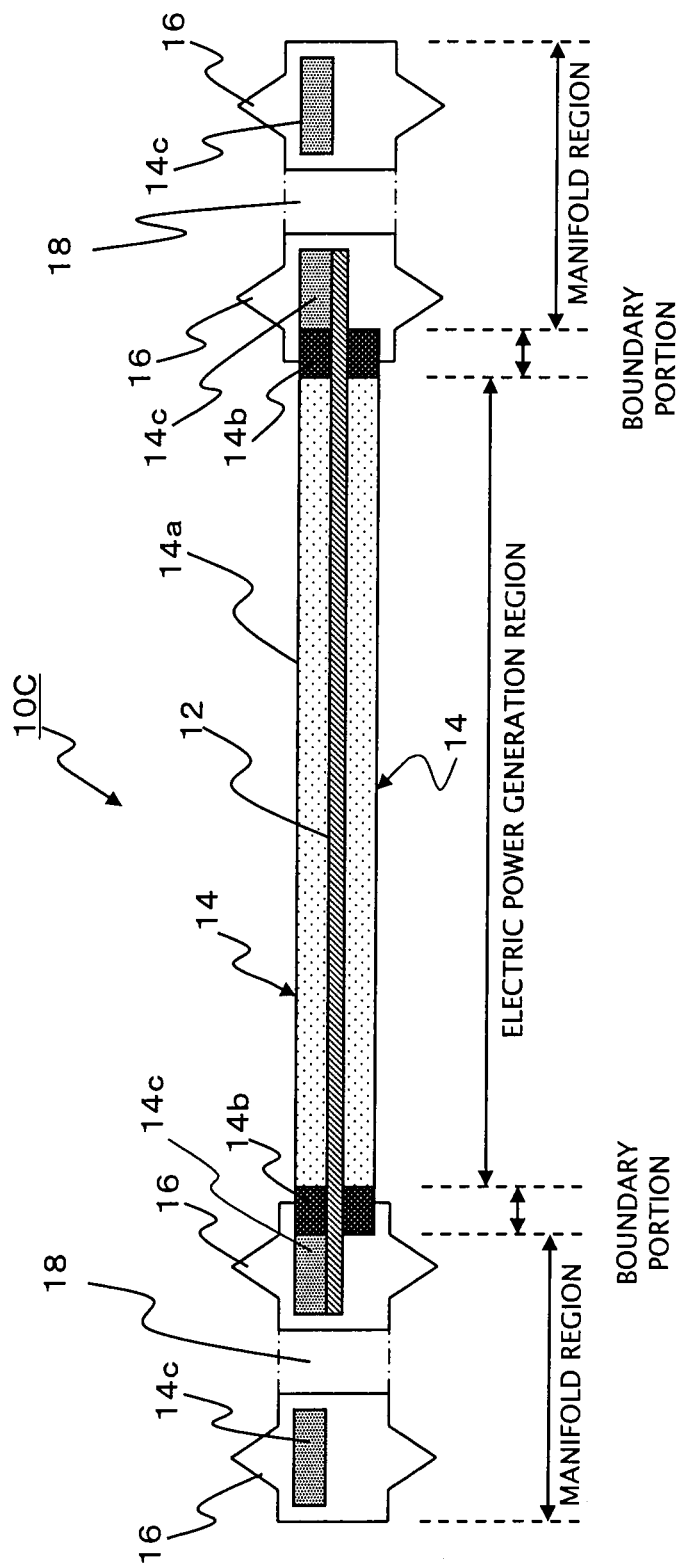
FIG. 3 is a cross-sectional view describing yet another example of the structure of a membrane electrode assembly in a cell for a fuel cell according to the present invention.

FIG. 3 illustrates the structure of a membrane electrode assembly 10C of a cell for a fuel cell according to a third embodiment. The structure of this membrane electrode assembly 10C of the third embodiment is the same as that of the membrane electrode assembly 10A of the first embodiment illustrated in FIG. 1, with the exception that whereas in the membrane electrode assembly 10A of the first embodiment, the end portions of the assembly 12 only extended beyond the electric power generation region as far as the boundary portions, in the membrane electrode assembly 100 of the third embodiment, both end portions of the assembly 12 extend beyond the respective boundary portion and into the manifold region.

Fourth Embodiment

Figure 4:
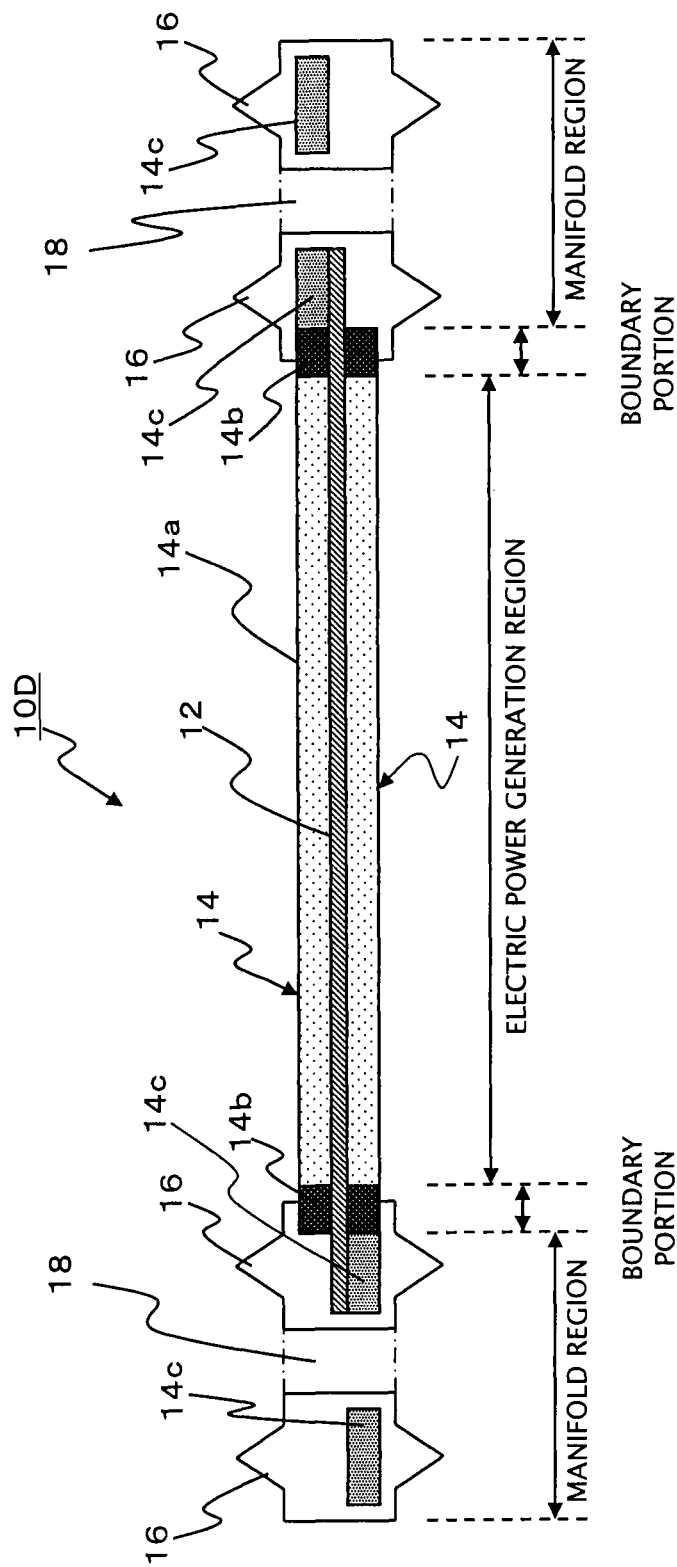
FIG. 4 is a cross-sectional view describing yet another example of the structure of a membrane electrode assembly in a cell for a fuel cell according to the present invention.

FIG. 4 illustrates the structure of a membrane electrode assembly 10D of a cell for a fuel cell according to a fourth embodiment. The structure of this membrane electrode assembly 10D of the fourth embodiment is the same as that of the membrane electrode assembly 10B of the second embodiment illustrated in FIG. 2, with the exception that whereas in the membrane electrode assembly 10B of the second embodiment, the end portions of the assembly 12 only extended beyond the electric power generation region as far as the boundary portions, in the membrane electrode assembly 10D of the fourth embodiment, both end portions of the assembly 12 extend beyond the respective boundary portion and into the manifold region.

In the third and fourth embodiments described above, because the assembly 12 generally exhibits a high degree of affinity with the liquid resin used for hermetically sealing the manifold region, the portion of the assembly that extends into the manifold region can be bonded to the liquid resin, thereby improving the bonding reliability of the cell for a fuel cell.

Fifth Embodiment

Figure 5:
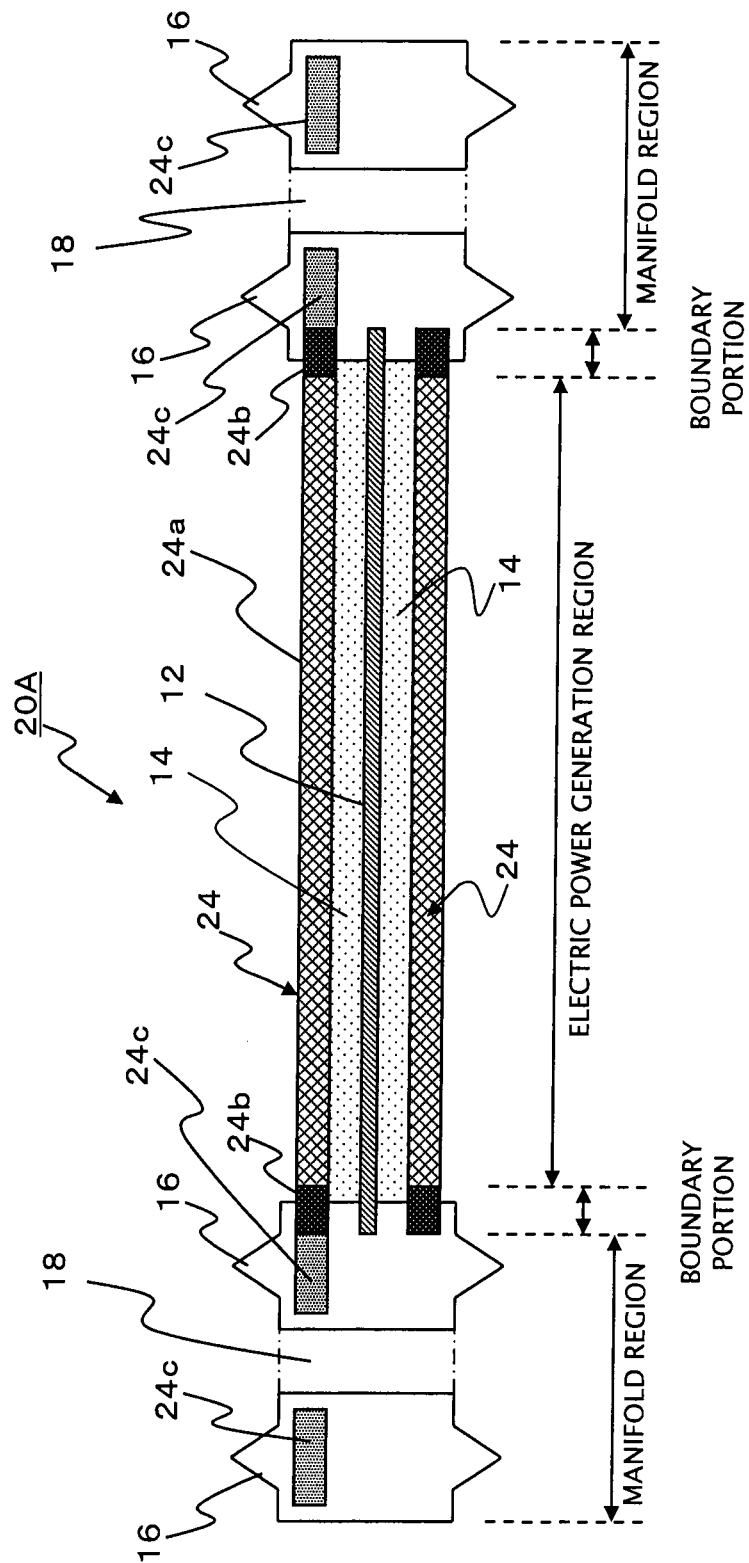
FIG. 5 is a diagram describing yet another example of the structure of a membrane electrode assembly in a cell for a fuel cell according to the present invention.

Next is a description of a cell for a fuel cell according to a fifth embodiment, with reference to FIG. 5. Those structural components that are the same as components in the first, second, third and fourth embodiments are labeled using the same symbols, and their description is omitted here.

As illustrated in FIG. 5, the cell for a fuel cell according to this embodiment comprises a membrane electrode assembly 20A, composed of an assembly 12 having a fuel electrode and an air electrode on an electrolyte membrane, first and second gas diffusion layers 14 that supply a fuel gas and an oxidizing gas to the fuel electrode and air electrode respectively in the assembly 12, and first and second porous passage layers 24 that are laminated to the first and second gas diffusion layers 14 respectively, wherein the membrane electrode assembly 20A is sandwiched between a pair of separators (not shown in the figure) described below. In this embodiment, the porous passage layers represent the first and second gas diffusion members of the present invention.

Moreover, the cell for a fuel cell according to the present embodiment includes an electric power generation region capable of generating electric power in which the assembly 12 and the first and second gas diffusion layers 14 are laminated together, and a manifold region, which is provided at the periphery of the electric power generation region and in which are provided manifold openings 18 that allow circulation of the fuel gas, the oxidizing gas and a coolant medium, wherein either one of the first and second porous passage layers 24 extends into the manifold region, and peripheral edge portions 24c of the extended porous passage layer 24 are hermetically sealed by impregnation with a liquid resin. In addition, a gasket 16 having elasticity and formed by curing a liquid resin is formed around the periphery of each manifold opening 18, and the peripheral edge portion 24c also functions as the core material for the gasket 16.

In the cell for a fuel cell of the present embodiment, the porosity of boundary portions 24b between the electric power generation region and the manifold region in the first and second porous passage layers 24 is relatively small, at least when compared with the porosity of the electric power generation region 24a within the first and second porous passage layers 24 and the porosity of the peripheral edge portion 24c in the manifold region. Moreover, the porosity of the boundary portions 24b within the first and second porous passage layers 24 is preferably smaller than the porosity of the peripheral edge portion 24c in the manifold region of the first or second porous passage layer 24. Ina more preferred configuration, the pore size within the boundary portions 24b between the electric power generation region and the manifold region in the first and second porous passage layers 24 is a pore size at which flow of a liquid resin becomes impossible, and is typically not more than 20 μm. This enables favorable gas sealing properties to be achieved by the boundary portions 24b, and also prevents the liquid resin that is impregnated into the gas diffusion layer to form the manifold region from penetrating into the electric power generation region.

Furthermore, in terms of the pore size in the electric power generation region 24a of the first and second porous passage layers 24, a pore size is selected that exceeds 20 μm and is capable of providing favorable gas circulation and water discharge properties. The pore size of the peripheral edge portions 24c of the first or second porous passage layer 24 is also selected as a pore size exceeding 20 μm, so as to enable impregnation with the liquid resin used for forming the manifold.

Figure 11:
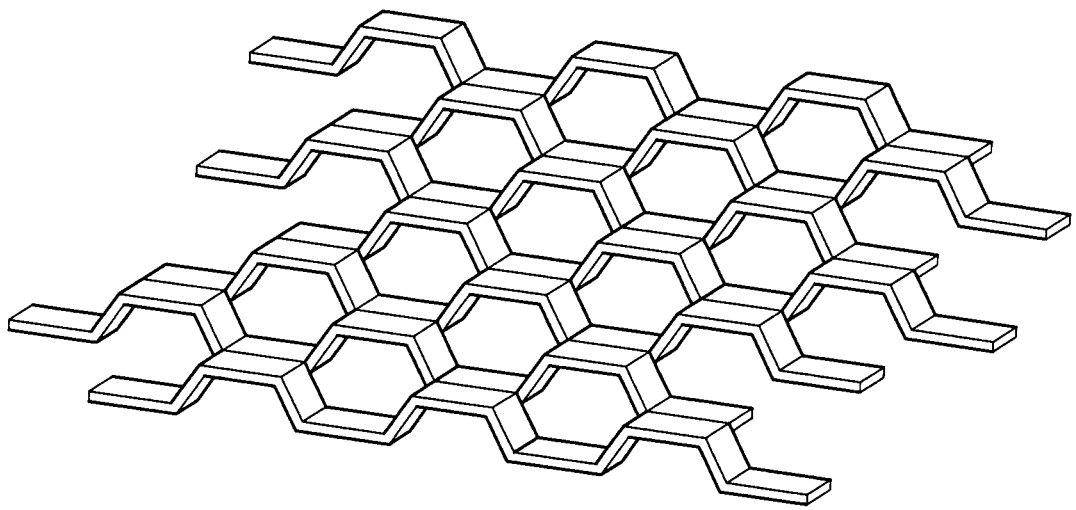
FIG. 11 is a perspective view illustrating one example of a gas diffusion member used in a porous passage layer.

The porous passage layers 24 may be formed, for example, using the type of lath cut metal or expanded metal illustrated in FIG. 11.

In the present embodiment, the term "lath cut metal" describes a flat thin metal sheet in which sequential zigzag cuts have been formed in the sheet, and these cuts have then been pushed and bent so as to form a network of narrow diameter through-holes in the metal. The term "expanded metal" describes a flat thin metal sheet in which sequential zigzag cuts have been formed in the sheet, these cuts have then been pushed and bent so as to form a network of narrow diameter through-holes in the metal, and the metal sheet has then be rolled to form a substantially flat sheet. Because an expanded metal sheet is molded as a substantially flat sheet, additional process steps for removing unnecessary bends or irregularities in the final molded product need not be conducted, meaning the production costs can be reduced.

Furthermore, in those cases where the porous passage layers 24 of the present embodiment also function as current collectors, any metal may be used provided it is the metal material used for the metal separators described below, although a material having a certain degree of rigidity that is able to oppose the pressure applied when a plurality of the above cells are stacked and compressed during production of a fuel cell, thereby ensuring that a predetermined level of gas circulation remains possible, is preferred. For example, titanium, stainless steel or aluminum is preferred. In those cases where a stainless steel or aluminum material is used, a surface treatment is preferably conducted following the channel-forming or lath-cutting processing described below, thereby imparting the metal surface with superior corrosion resistance and conductivity.

Sixth Embodiment

Figure 6:
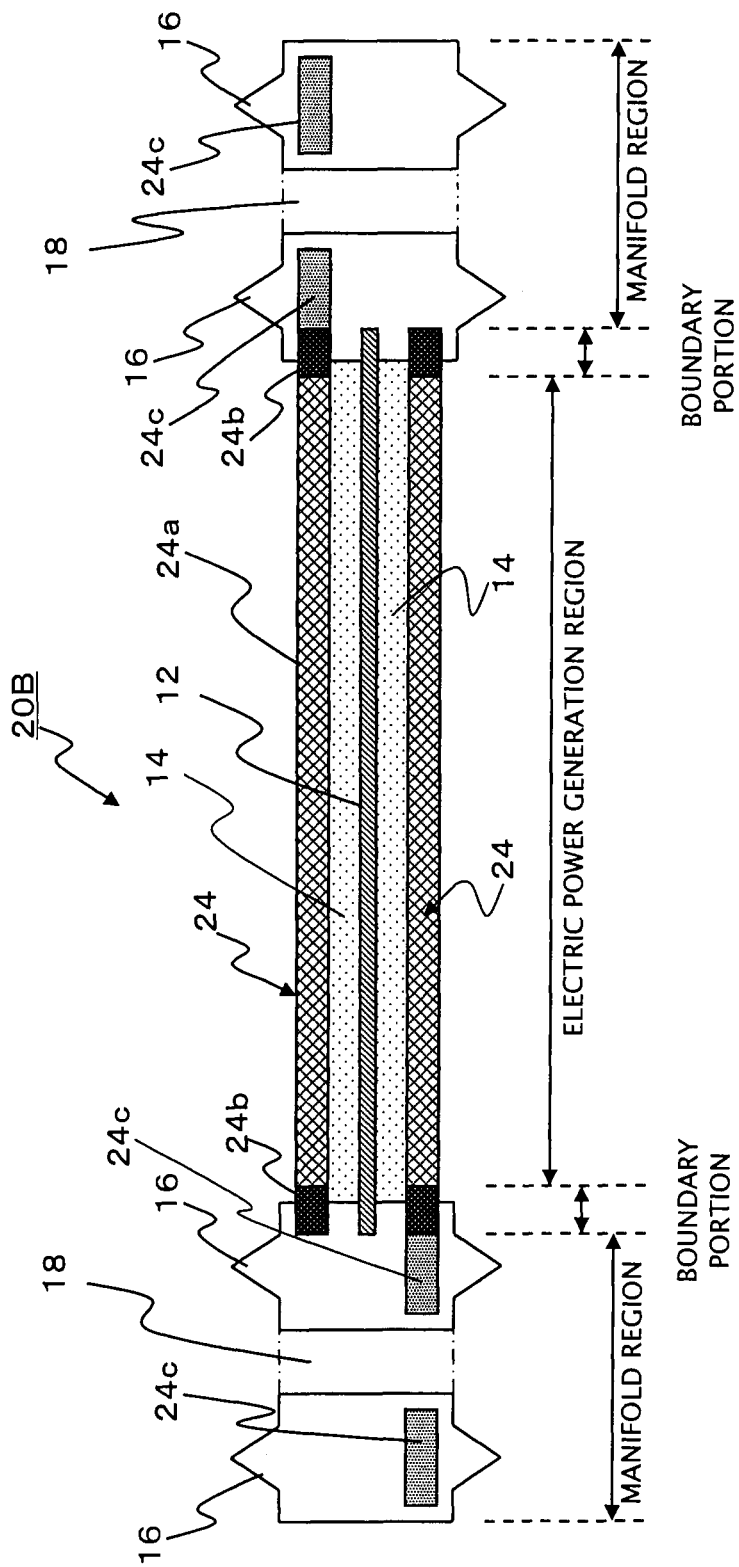
FIG. 6 is a cross-sectional view describing yet another example of the structure of a membrane electrode assembly in a cell for a fuel cell according to the present invention.

FIG. 6 illustrates the structure of a membrane electrode assembly 20B of a cell for a fuel cell according to a sixth embodiment. The structure of this membrane electrode assembly 20B of the sixth embodiment is the same as that of the membrane electrode assembly 20A of the fifth embodiment illustrated in FIG. 5, with the exception that whereas in the membrane electrode assembly 20A of the fifth embodiment, only the end portions of one of the porous passage layers 24 were extended into the manifold region, in the membrane electrode assembly 20B of the sixth embodiment, one end portion of both the first and second porous passage layers 24 extends into the manifold region, and the peripheral edge portions 24c of the first and second porous passage layers 24 are formed so as not to overlap.

In the fifth and sixth embodiments, the extended peripheral edge portions 24c of the first and second porous passage layers 24 are formed so as not to overlap, but in those cases where the liquid resin impregnation properties within the peripheral edge portions 24c are favorable and satisfactory gas sealing properties can be ensured, the peripheral edge portions 24c of the two porous passage layers 24 may be formed in an overlapping arrangement. In such overlapping structures, because the thickness of the MEA assembly 12 ensures satisfactory clearance between the two porous passage layers, a membrane or film need not necessarily be provided between the two porous passage layers, provided that either molding is conducted so that the two layers do not make contact, or an insulating treatment is performed in advance within the manifold region of one of the layers.

Seventh Embodiment

Figure 7:
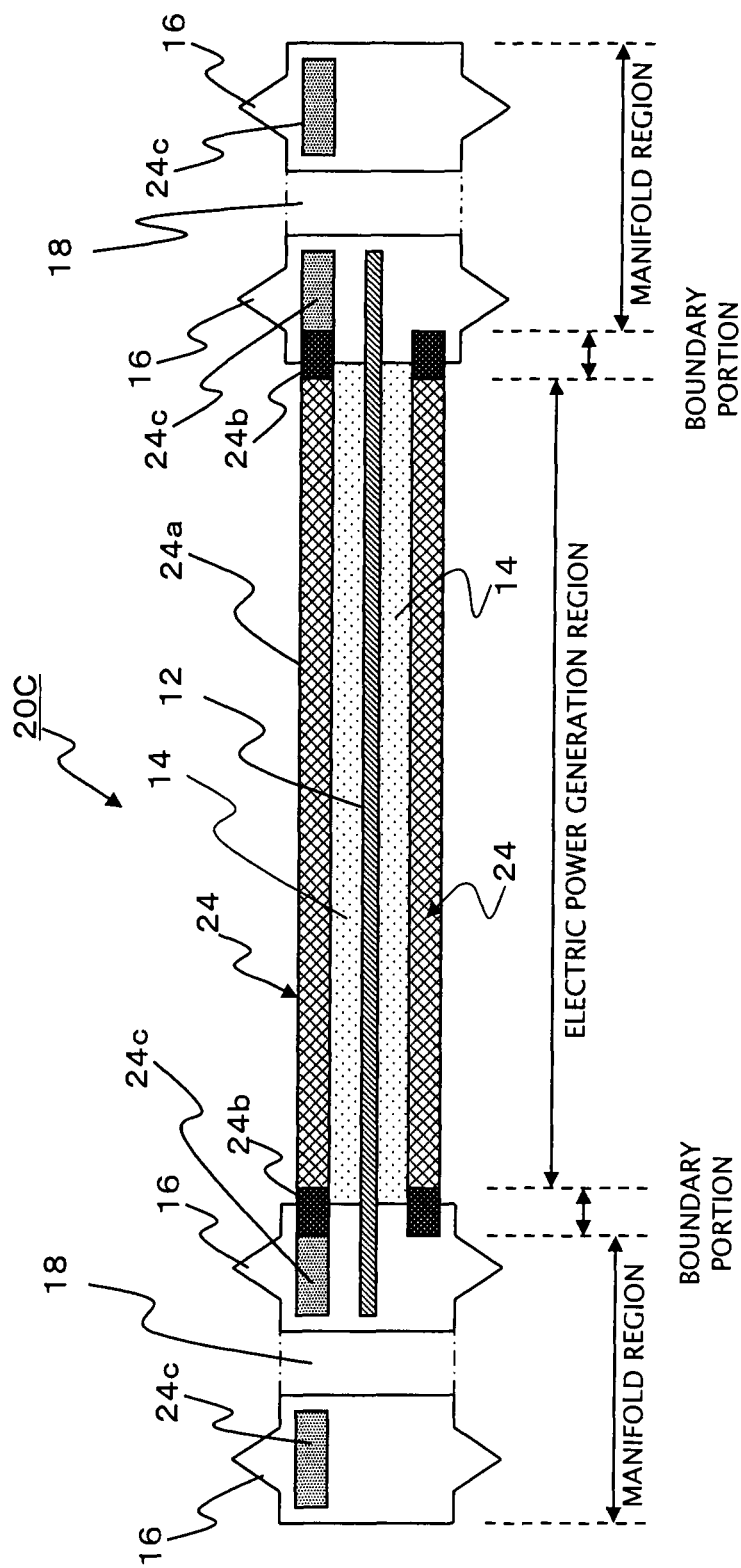
FIG. 7 is a cross-sectional view describing yet another example of the structure of a membrane electrode assembly in a cell for a fuel cell according to the present invention.

FIG. 7 illustrates the structure of a membrane electrode assembly 20C of a cell for a fuel cell according to a seventh embodiment. The structure of this membrane electrode assembly 20C of a cell for a fuel cell according to the seventh embodiment is the same as that of the membrane electrode assembly 20A of the fifth embodiment illustrated in FIG. 5, with the exception that whereas in the membrane electrode assembly 20A of the fifth embodiment, the end portions of the assembly 12 only extended beyond the electric power generation region as far as the boundary portions, in the membrane electrode assembly 20C of a cell for a fuel cell according to the seventh embodiment, both end portions of the assembly 12 extend beyond the respective boundary portion and into the manifold region.

Eighth Embodiment

Figure 8:
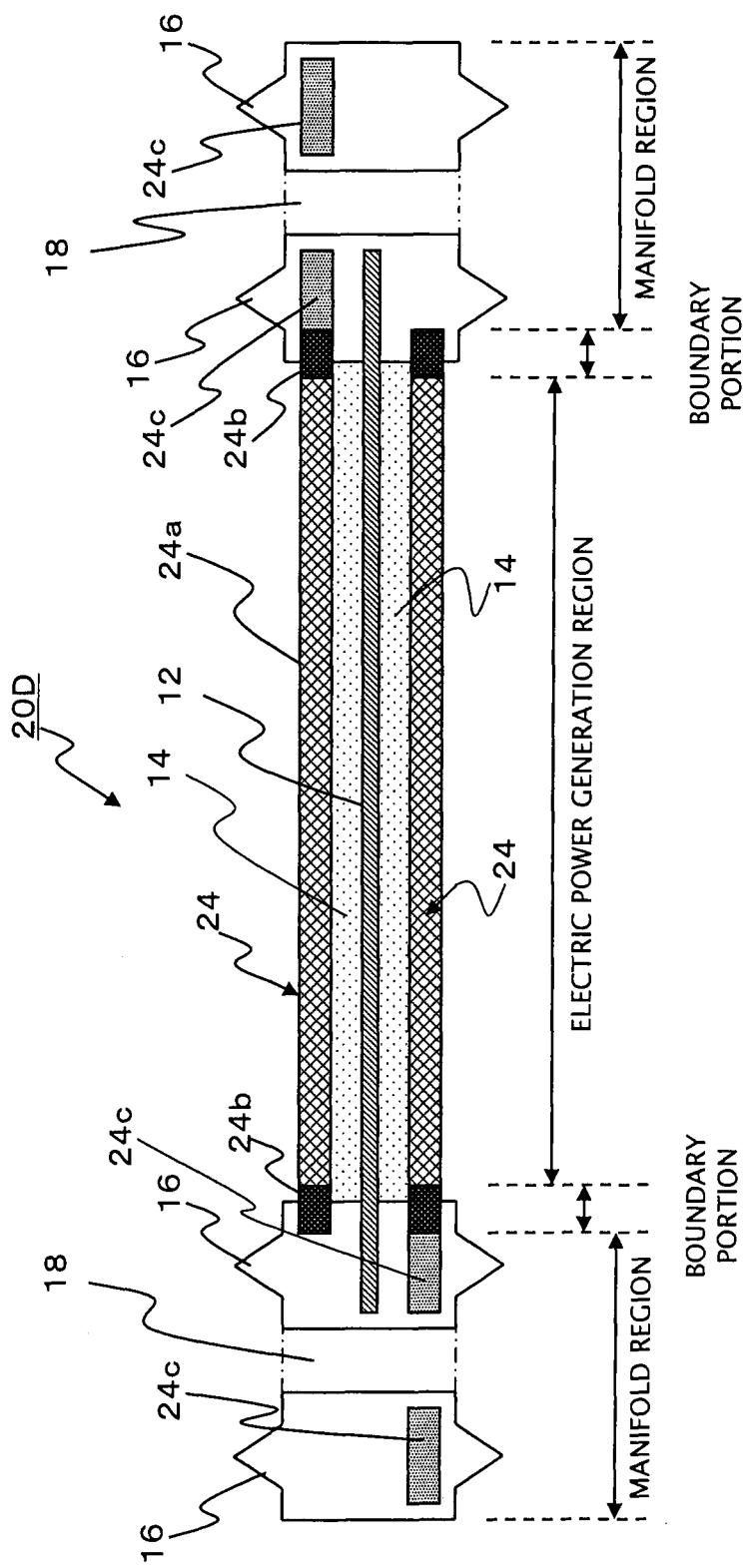
FIG. 8 is a cross-sectional view describing yet another example of the structure of a membrane electrode assembly in a cell for a fuel cell according to the present invention.

FIG. 8 illustrates the structure of a membrane electrode assembly 20D of a cell for a fuel cell according to an eighth embodiment. The structure of this membrane electrode assembly 20D of a cell for a fuel cell according to the eighth embodiment is the same as that of the membrane electrode assembly 20B of the sixth embodiment illustrated in FIG. 6, with the exception that whereas in the membrane electrode assembly 20B of the sixth embodiment, the end portions of the assembly 12 only extended beyond the electric power generation region as far as the boundary portions, in the membrane electrode assembly 20D of a cell for a fuel cell according to the eighth embodiment, both end portions of the assembly 12 extend beyond the respective boundary portion and into the manifold region.

In the seventh and eighth embodiments described above, because the assembly 12 generally exhibits a high degree of affinity with the liquid resin used for hermetically sealing the manifold region, the portion of the assembly that extends into the manifold region can be bonded to the liquid resin, thereby improving the bonding reliability of the cell for a fuel cell.

Ninth Embodiment

Figure 9:
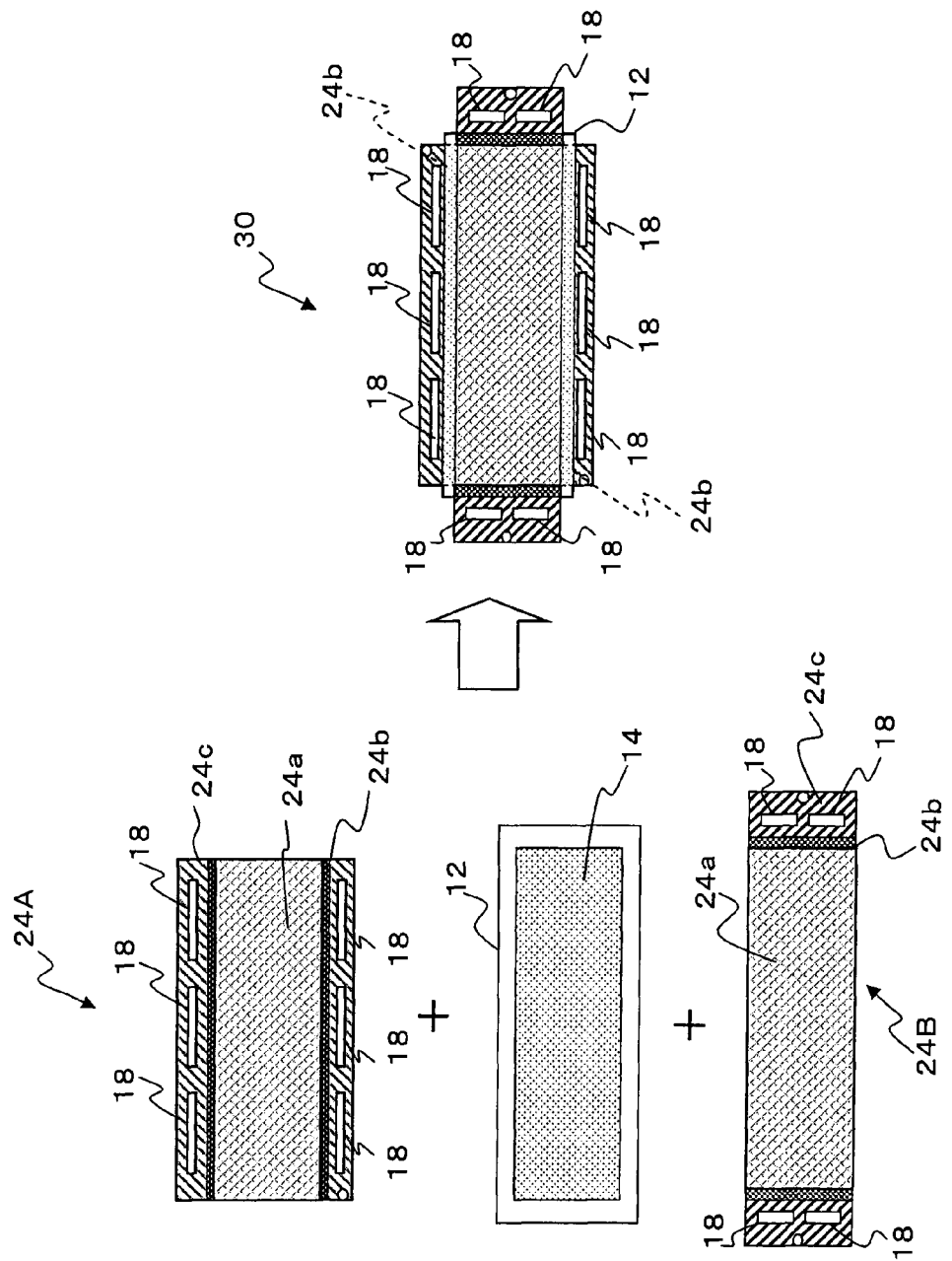
FIG. 9 is a top view describing a production example for yet another membrane electrode assembly in a cell for a fuel cell according to the present invention.

Next is a description of a cell for a fuel cell according to a ninth embodiment, with reference to FIG. 9. Those structural components that are the same as components in the first to eighth embodiments are labeled using the same symbols, and their description is omitted here.

As illustrated in FIG. 9, peripheral end portions 24c of first and second porous passage layers 24A and 24B are molded so as to extend in mutually different directions without overlapping within the manifold region. Moreover, as illustrated in FIG. 9, a preliminary membrane electrode assembly comprising gas diffusion layers 14 formed on both surfaces of an assembly 12 is positioned within an electric power generation region 24a of each of the first and second porous passage layers 24A and 24B, and a membrane electrode assembly 30 is formed by sandwiching this preliminary membrane electrode assembly between the first and second porous passage layers 24A and 24B. The cross-sectional structure of the membrane electrode assembly 30 of this embodiment is the same as the structure of the membrane electrode assembly 20A illustrated in FIG. 5.

According to the present embodiment, because the first and second porous passage layers 24A and 24B of the anode side and the cathode side are formed in the manner described above, short-circuits or gas leakage between the anode and the cathode can be prevented, and the productivity can also be improved. The first and second porous passage layers 24A and 24B may also represent the cathode side and the anode side respectively, in an opposite arrangement to that described above.

Figure 12:
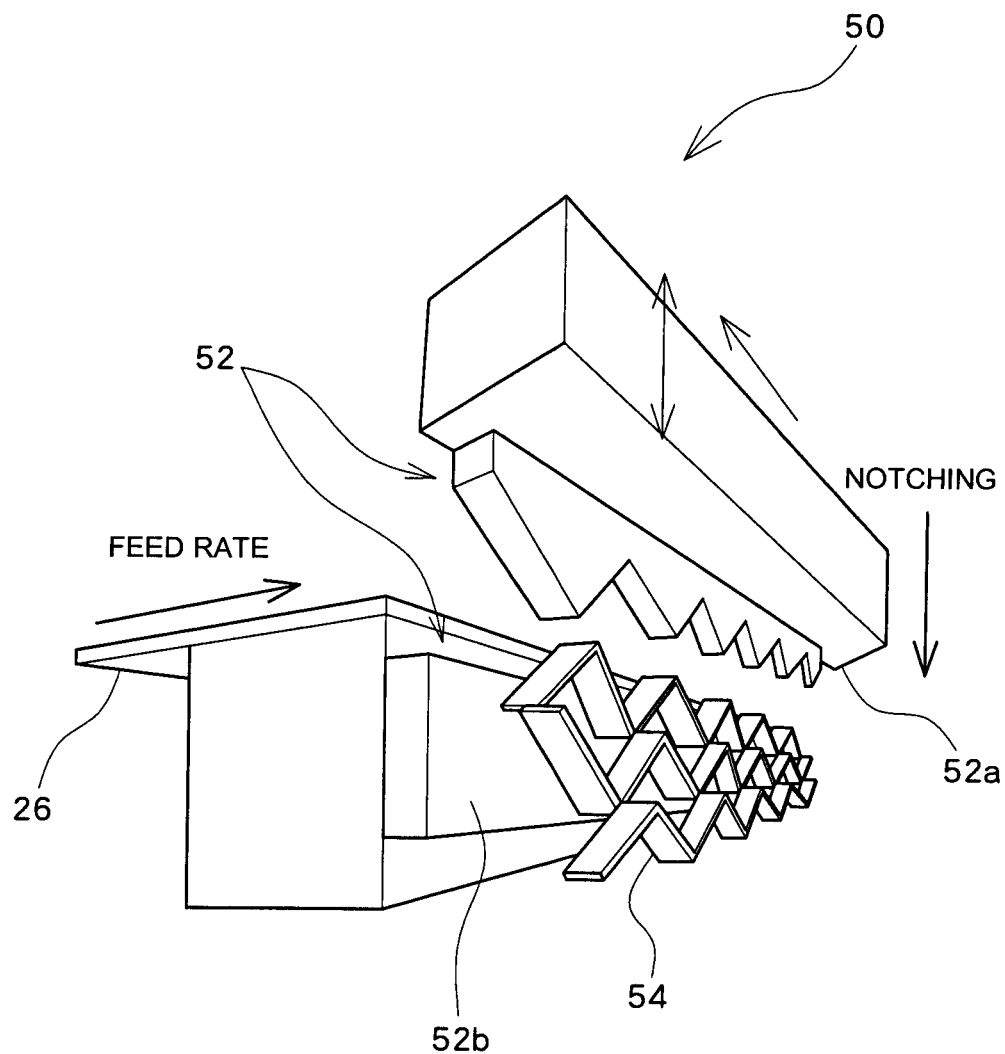
FIG. 12 is a schematic view illustrating the construction of a lath cut apparatus used for producing a gas diffusion member used in a porous passage layer.

In those cases where a lath cut metal or the like is used as the first and second porous passage layers 24A and 24B described above, the layers can be formed using the type of lath cutting apparatus 50 illustrated in FIG. 12.

In the lath cutting apparatus 50 illustrated in FIG. 12, lath cutting blades 52, comprising a lath cutting blade 52a that is moved up and down to generate notch-like cuts and a fixed blade 52b, are provided at the leading edge in the feed direction of a metal plate 26 that is to undergo lath cutting. The fixed blade 52b is fixed to the lath cutting apparatus 50 at the leading edge in the feed direction of the metal plate 26, and the lath cut metal 54 with notches formed therein is formed at the outside surface of the fixed blade 52b. Accordingly, in the lath cutting apparatus 50, by controlling the feed rate of the metal plate 26 and the fall distance over which the notch-generating lath cutting blade 52a is lowered, the porosity of each region of the lath cut metal can be altered. In other words, taking the porous passage layer 24A shown in FIG. 9 as an example, firstly, when forming the peripheral edge portion 24c, the feed rate for the metal plate 26 and the fall distance for the notch-generating lath cutting blade 52a are adjusted so that, for example, the pore size exceeds 20 μm and the degree of opening is sufficient to allow impregnation by a liquid resin. Next, when forming the boundary portion 24b, the feed rate for the metal plate 26 and the fall distance for the notch-generating lath cutting blade 52a are adjusted so that, for example, the pore size is not more than 20 μm, and when subsequently forming the electric power generation region 24a, the feed rate for the metal plate 26 and the fall distance for the notch-generating lath cutting blade 52a are adjusted so that, for example, the pore size exceeds 20 μm and the degree of opening is sufficient to ensure satisfactory gas circulation and water discharge properties. By subsequently forming the other boundary portion 24b and peripheral edge portion 24c by adjusting the degree of opening in the manner described above, a porous passage layer 24A comprising regions having different porosities can be formed. The boundary portions 24b may also be formed as structures in which essentially no pores exist, by feeding the metal plate 26 while temporarily halting the lath cutting process.

In the present embodiment, a single lath cutting direction is used in the porous passage layers 24A and 24B having regions of different porosities, but the present invention is not restricted to such a configuration, and for example, the porous passage layers 24A and 24B may be produced by using the lath cutting apparatus 50 to separately prepare a lath cut metal in which are formed the electric power generation region 24a and the boundary portions 24b at the two ends thereof, and a lath cut metal in which are formed the pair of periphery end portions 24c, and then joining these two separate lath cut metals (for example, by welding) so that they display different lath cutting directions.

Tenth Embodiment

Figure 10:
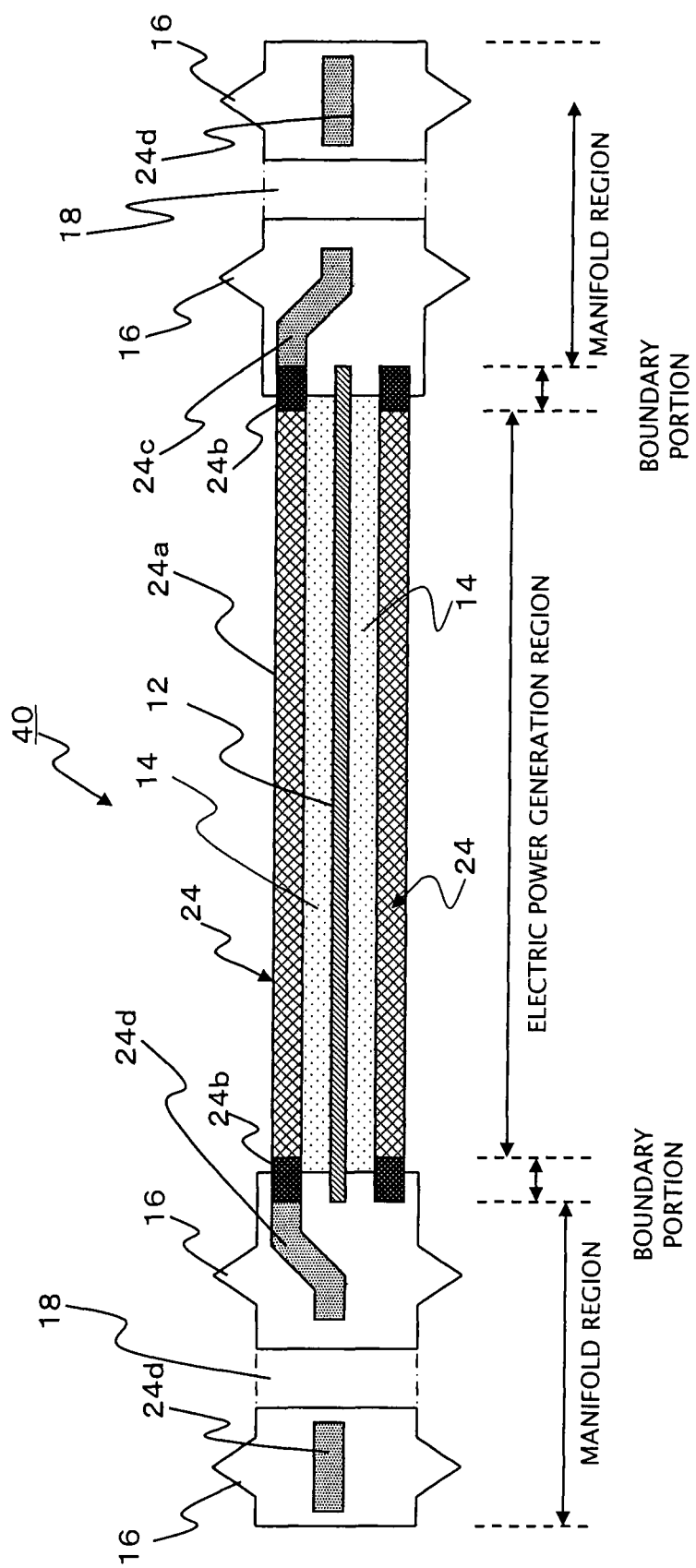
FIG. 10 is a cross-sectional view describing yet another example of the structure of a membrane electrode assembly in a cell for a fuel cell according to the present invention.

Next is a description of a cell for a fuel cell according to a tenth embodiment, with reference to FIG. 10. Those structural components that are the same as components in the first to ninth embodiments are labeled using the same symbols, and their description is omitted here.

In this embodiment, as illustrated in FIG. 10, when impregnating the ends of the peripheral edge portions 24c of one of the porous passage layers 24 with a liquid resin and subsequently forming the gaskets 16, each peripheral edge portion 24c is deformed in advance so that the end of the peripheral edge portion 24c is positioned in the center across the thickness direction of the gasket 16. The centrally positioned peripheral edge portion 24c of the porous passage layer 24 functions as a reinforcing layer, and when the unit cells are used to form a stack, enables the reactive force generated by the resin that forms the gasket 16 to act uniformly against the pressure that is applied from above and below the gasket 16, meaning distortion of the gasket 16 due to the applied pressure can be suppressed. As a result, the gas sealing properties of a fuel cell prepared by stacking the unit cells can be further improved.

In FIG. 10, the peripheral edge portions 24c of the porous passage layers 24 were deformed to form reinforcing layers within the gaskets 16, but the present invention is not limited to this configuration, and for example, the peripheral edge portion 14c of gas diffusion layers 14 such as those illustrated in FIG. 1 may be distorted to form the reinforcing layers. The thickness of the porous passage layer 24 formed using a lath cut metal or the like is typically from 0.2 to 0.3 mm, and because this thickness is considerably larger than the 100 to 280 μm thickness of the gas diffusion layer 14 shown in FIG. 1, the porous passage layer 24 is ideal as a reinforcing layer. Moreover, in those cases where the porous passage layer 24 is formed using a lath cut metal, the deformed peripheral edge portions 24c mentioned above can be formed by performing an additional bending deformation at the start point and the end point of the lath cutting process using the lath cutting apparatus 50 (FIG. 12) described above.

Figure 13:
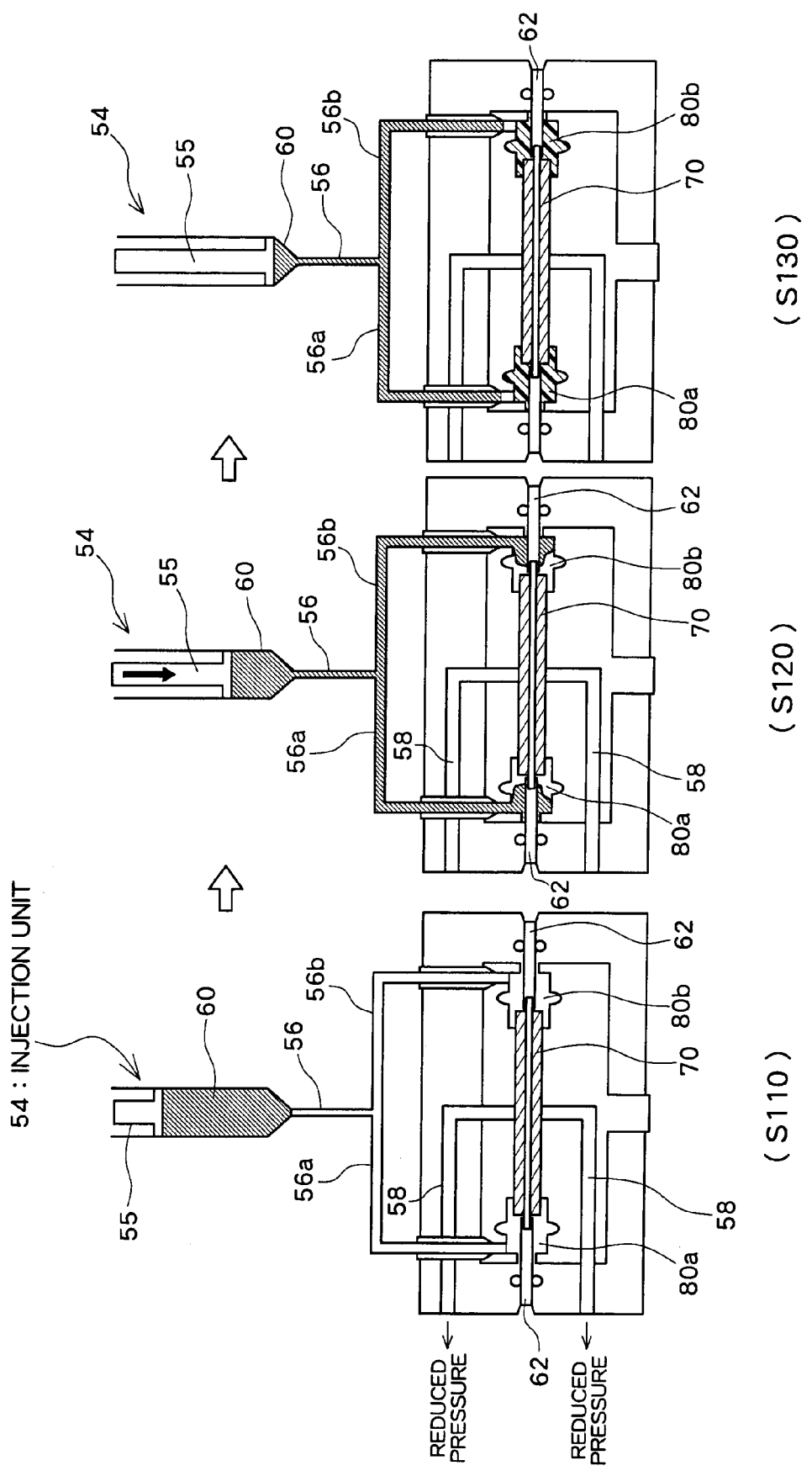
FIG. 13 is a diagram describing one example of the steps in a method of producing an integrated gasket-type membrane electrode assembly.

One example of a method of performing the liquid resin impregnation and integrally molding the membrane electrode assembly in the first through tenth embodiments is described below with reference to FIG. 13. FIG. 13 represents an example in which injection molding using a molding die, such as liquid injection molding (LIM), is used. A thermosetting silicon-based resin or a thermoplastic resin may be used as an LIM material 60 described below. Further, in order to simplify the following description, the membrane electrode assemblies 10A to 10D, 20A to 20D, 30 and 40 from the first to tenth embodiments are referred to using the generic description "membrane electrode assembly 70".

First, the LIM material 60 composed of the type of material described above for forming the gaskets is weighed in an injection unit 54, the membrane electrode assembly 70 is positioned inside the mold by securing the peripheral end portions of the membrane electrode assembly 70 using a fixing unit 62, and the inside of the molding die is then evacuated using pressure reduction pipes 58 to remove the air from inside the molding die (S110). Subsequently, once the inside of the die has reached the required reduced pressure state, the pressure reduction operation is halted, a piston 55 of the injection unit 54 is activated, and the LIM material 60 is injected through injection pipes 56, 56a and 56b into die portions 80a and 80b used for forming the gaskets (S120). Following completion of the filling of the gasket-forming die portions 80a and 80b with the LIM material 60, the LIM material 60 is subjected to heat curing (S130). This completes the formation of an integrated gasket-type membrane electrode assembly.

Figure 14:
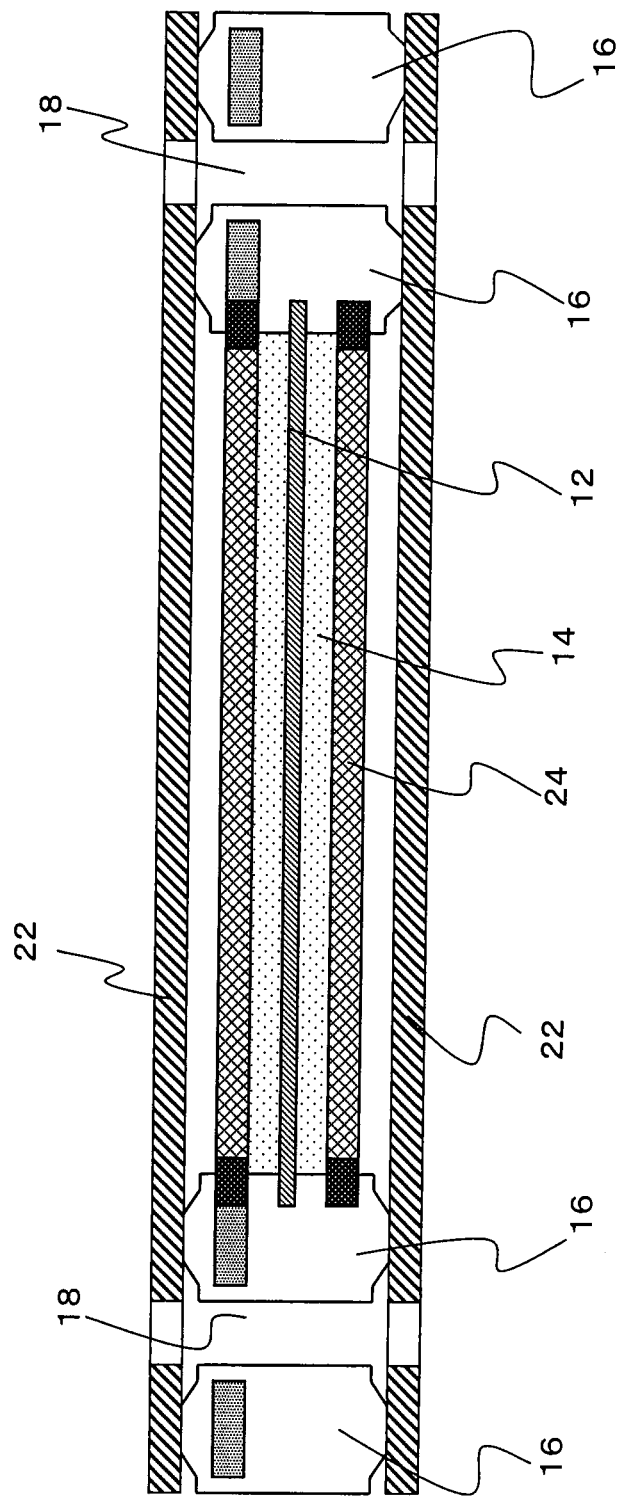
FIG. 14 is a cross-sectional view describing one example of the structure of a cell for a fuel cell according to the present invention.

Next is a description of an example of a unit cell structure with reference to FIG. 14. In the unit cell illustrated in FIG. 14, the membrane electrode assembly 20A illustrated in FIG. 5 is sandwiched between a pair of flat separators 22. In this example, the surface of each flat separator 22 that contacts the membrane electrode assembly 20A (FIG. 5) is a flat surface.

In recent years, metal separators have become widely used as fuel cell separators due to their superior durability, and these metal separators must exhibit a combination of corrosion resistance and conductivity. Titanium separators are one example of a metal capable of achieving this combination of corrosion resistance and conductivity. However, titanium has a high degree of rigidity, and cannot be press worked as easily as stainless steel, meaning the passages must be formed using methods other than pressing. Accordingly, structures have been proposed in which flat titanium separators are used, and passages are formed between these flat separators and the gas diffusion layers using porous materials. The lath cut metals and expanded metals described above are used as pseudo porous material passage layers.

The above unit cell was described using the membrane electrode assembly 20A illustrated in FIG. 5, but the invention is not limited to this configuration, and the membrane electrode assemblies 20B, 30 and 40 illustrated in FIG. 6, FIG. 9 and FIG. 10 may also be used.

Figure 15:
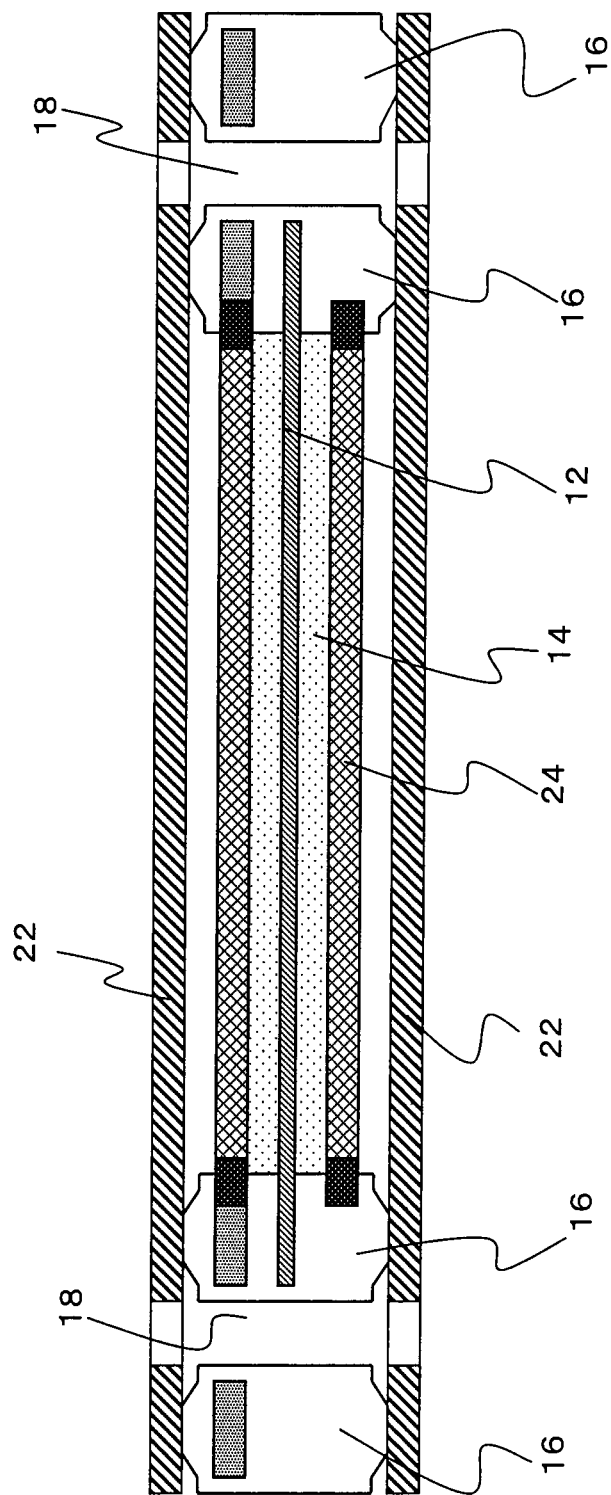
FIG. 15 is a cross-sectional view describing another example of the structure of a cell for a fuel cell according to the present invention.

Further, another example of a unit cell structure is illustrated in FIG. 15. In the unit cell illustrated in FIG. 15, the membrane electrode assembly 20C illustrated in FIG. 7 is sandwiched between a pair of flat separators 22. In this example, the surface of each flat separator 22 that contacts the membrane electrode assembly 20C (FIG. 7) is a flat surface. Moreover, although this unit cell was described using the membrane electrode assembly 20C illustrated in FIG. 7, the invention is not limited to this configuration, and the membrane electrode assembly 20D illustrated in FIG. 8 may also be used.

Figure 16:
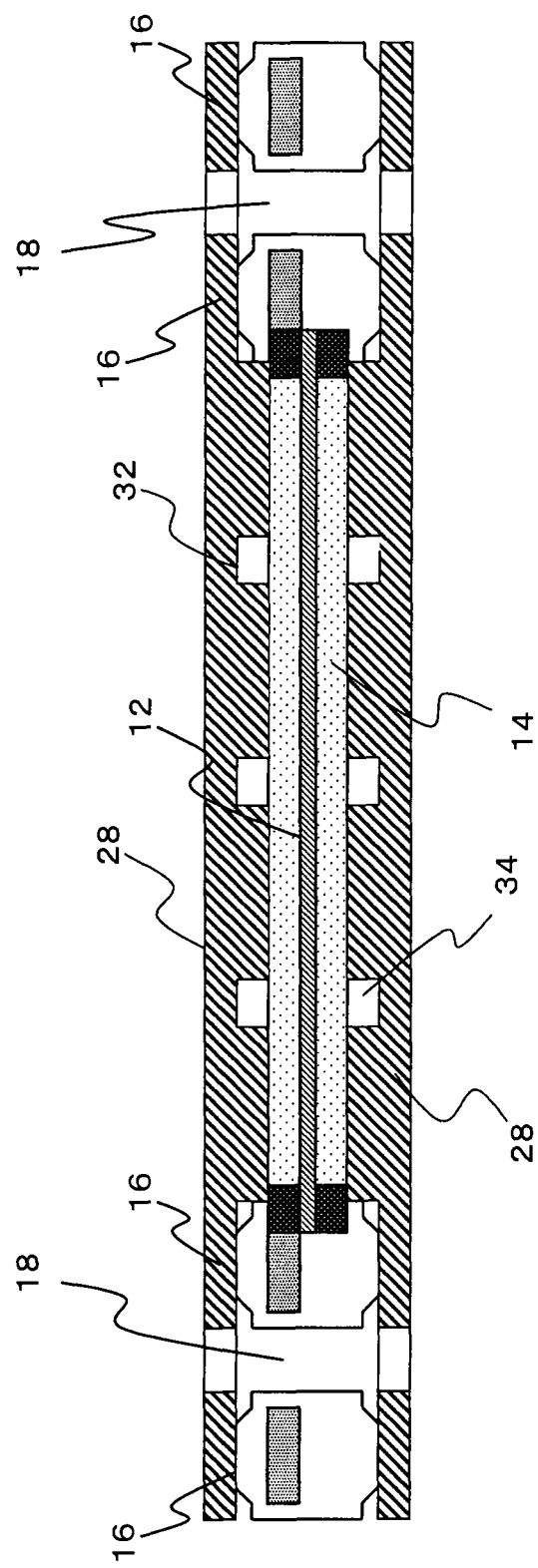
FIG. 16 is a cross-sectional view describing yet another example of the structure of a cell for a fuel cell according to the present invention.

Furthermore, yet another example of a unit cell structure is illustrated in FIG. 16. In the unit cell illustrated in FIG. 16, the membrane electrode assembly 10A illustrated in FIG. 1 is sandwiched between a pair of separators 28. Reaction gas passages 32, 34 are formed within the pair of separators 28, and coolant medium passages (not shown in the figure) are formed in the opposite surface from the surface in which the reaction gas passages 32, 34 are formed. The separators 28 are formed using a metal material such as a stainless steel or aluminum material.

Although this unit cell was described using the membrane electrode assembly 10A illustrated in FIG. 1, the invention is not limited to this configuration, and the membrane electrode assembly 10B illustrated in FIG. 2 may also be used.

Figure 17:
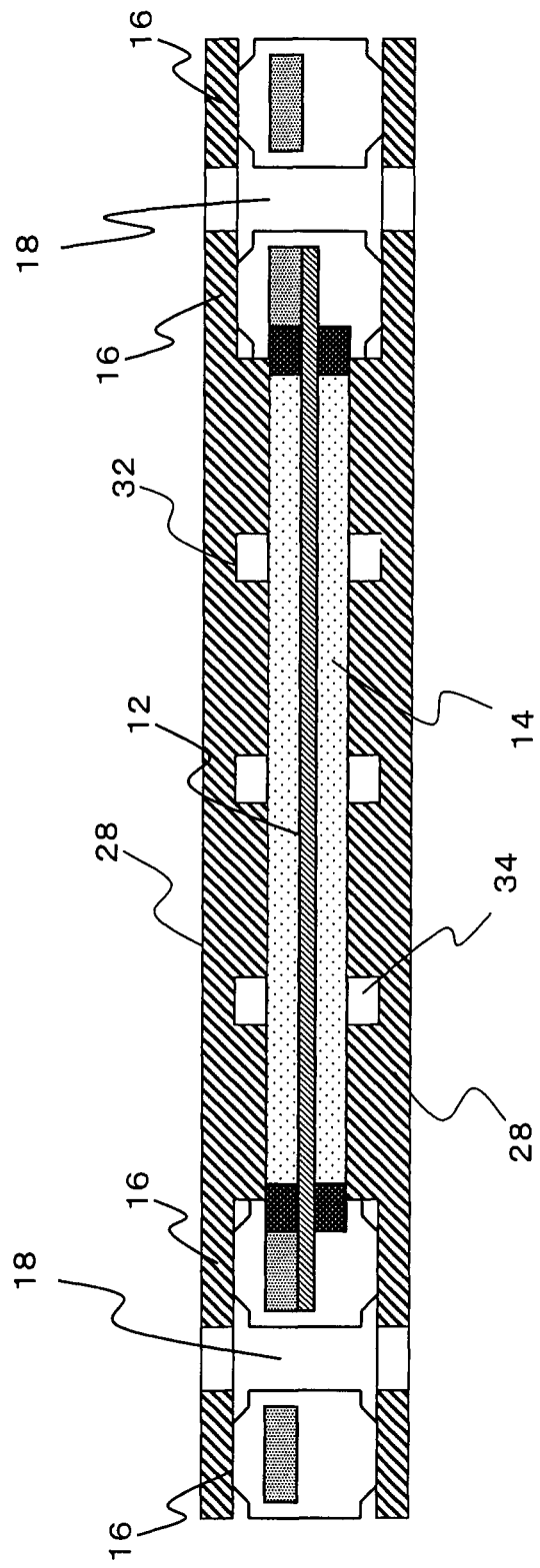
FIG. 17 is a cross-sectional view describing yet another example of the structure of a cell for a fuel cell according to the present invention.

Furthermore, yet another example of a unit cell structure is illustrated in FIG. 17. In the unit cell illustrated in FIG. 17, the membrane electrode assembly 10C illustrated in FIG. 3 is sandwiched between a pair of flat separators 22. In this example, the surface of each separator 28 that contacts the membrane electrode assembly 100 (FIG. 3) is having the reaction gas passages 32, 34. Moreover, although this unit cell was described using the membrane electrode assembly 100 illustrated in FIG. 3, the invention is not limited to this configuration, and the membrane electrode assembly 10D illustrated in FIG. 4 may also be used.

Figure 18A:
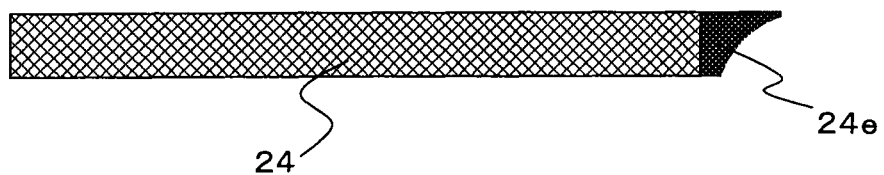
FIG. 18A is a diagram describing one example of the formation of a sealing portion.
Figure 18B:
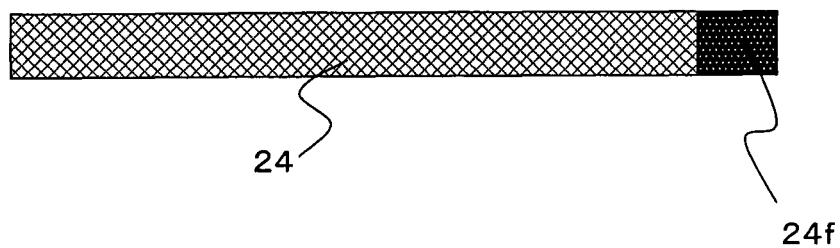
FIG. 18B is a diagram describing another example of the formation of a sealing portion.
Figure 19:
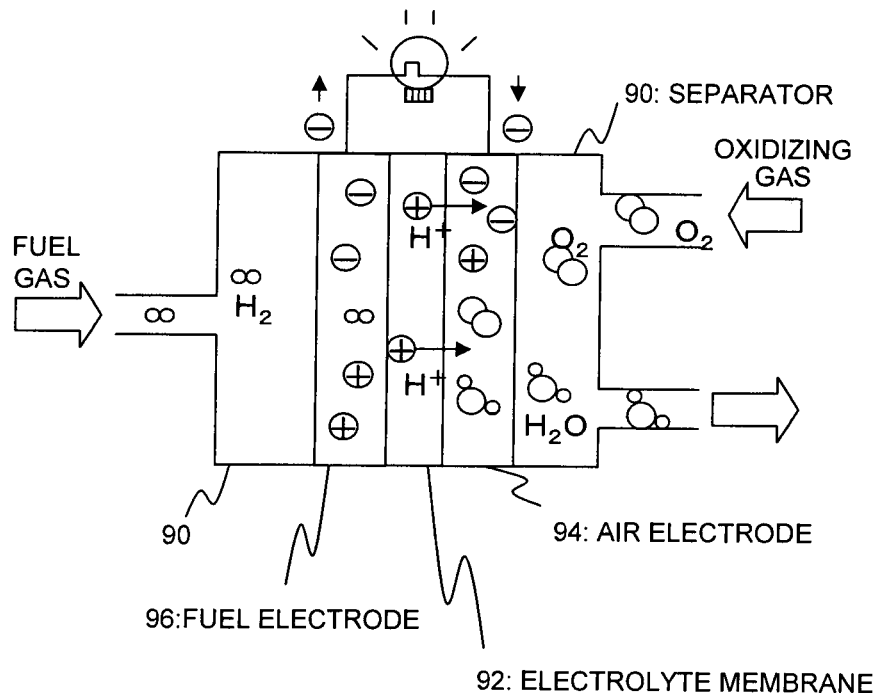
FIG. 19 is a diagram describing the structure of a cell within a fuel cell, and the mechanism during electric power generation.
Figure 20:
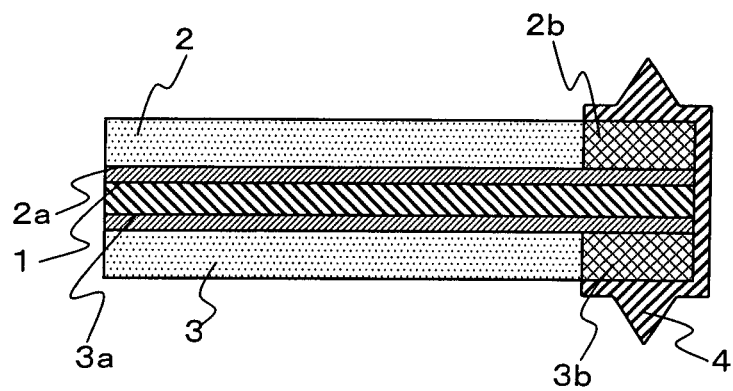
FIG. 20 is a partial cross-sectional view illustrating one example of the structure of structural components for a conventional fuel cell.
Figure 21:
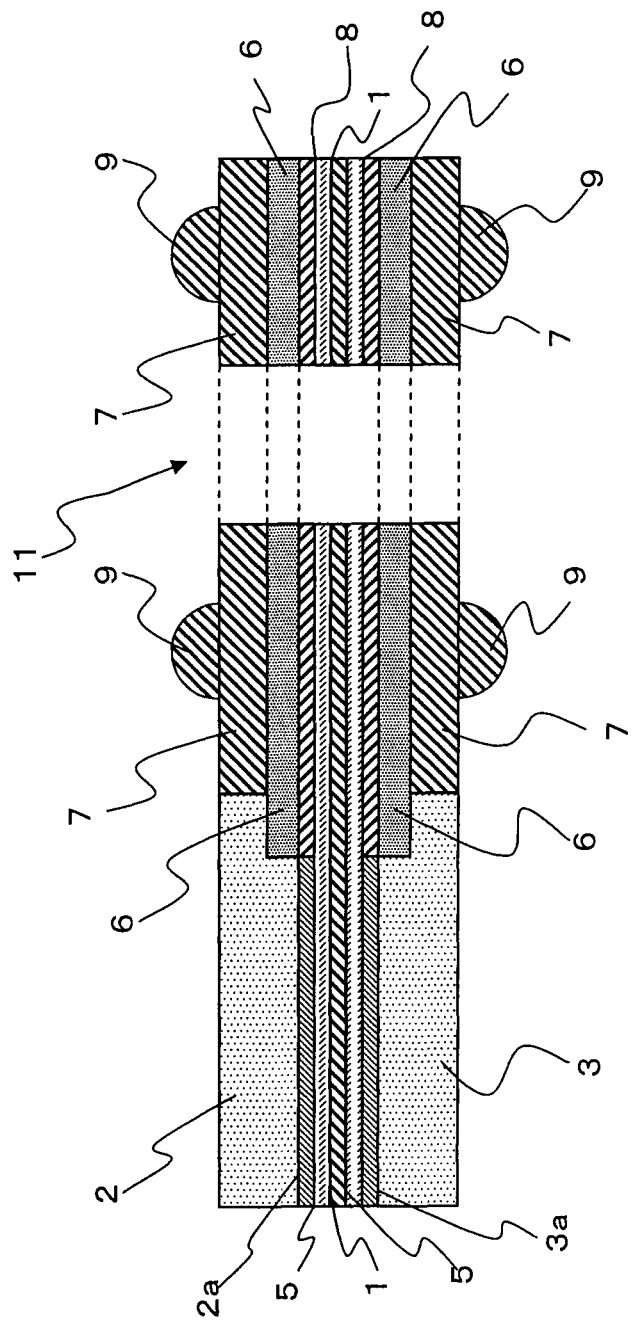
FIG. 21 is a partial cross-sectional view illustrating one example of the structure of a conventional membrane electrode assembly.

Furthermore, the boundary portions 24e and 24f of the porous passage layers 24, 24A and 24B in the membrane electrode assemblies 20A to 20D, 30 and 40 of the fifth through tenth embodiments described above may be sealed in advance as illustrated in FIG. 18A and FIG. 18B. This enables the prevention of impregnation of the porous passage layers 24, 24A and 24B with excessive amounts of liquid resin during formation of the gaskets, enabling an effective electrode surface area to be maintained. Further, when conducting the sealing, the boundary portion 24e may be formed by pressing, or a technique such as brazing, welding or screen printing may be used to impregnate the boundary portion 24f with a separate resin in advance. Furthermore, in a similar manner, those sides of the porous passage layer where a manifold opening is not formed are preferably sealed in advance by using a pressing, brazing, welding or screen printing technique to impregnate the edge of the layer with a separate resin, thus forming a sealed portion. This enables the prevention of excessive impregnation of the liquid resin, enabling an effective electrode surface area to be maintained.

Moreover, a fuel cell can be formed by stacking the above unit cells. Because cells having a reduced number of components are stacked, the size of the fuel cell can be reduced, and in addition, the gas sealing properties can be improved and the electric power generation efficiency for each cell of the fuel cell can be improved.

Although the present invention has been described above in detail, the scope of the present invention is in no way limited by the above description.

INDUSTRIAL APPLICABILITY

A cell for a fuel cell and a fuel cell according to the present invention are effective in all manner of applications that utilize fuel cells, and can be applied particularly effectively to fuel cells for motor vehicles.

The invention claimed is:

1. A cell for a fuel cell, comprising an assembly having a fuel electrode and an air electrode provided on an electrolyte membrane, a first gas diffusion member that supplies a fuel gas to the fuel electrode, a second gas diffusion member that supplies an oxidizing gas to the air electrode, and a pair of separators that sandwich the first gas diffusion member, the assembly, and the second gas diffusion member, wherein:

the cell for a fuel cell has an electric power generation region in which the assembly is positioned, a first manifold region, which is provided at a periphery of the electric power generation region, and in which first manifold openings are formed to allow passage of the fuel gas, and a second manifold region, which is provided at the periphery of the electric power generation region, and in which second manifold openings are formed to allow passage of the oxidizing gas, the first gas diffusion member extends to the first manifold region and is hermetically sealed by impregnation with a liquid resin, the second gas diffusion member extends to the second manifold region and is hermetically sealed by impregnation with a liquid resin, a porosity of a first boundary portion between the electric power generation region and the first manifold region in the first gas diffusion member is smaller than a porosity of the first manifold region within the first gas diffusion member, and a porosity of a second boundary portion between the electric power generation region and the second manifold region in the second gas diffusion member is smaller than a porosity of the second manifold region within the second gas diffusion member.

2. The cell for a fuel cell according to claim 1, wherein the assembly extends to the first manifold region and/or the second manifold region and is bonded to a liquid resin that forms a hermetic seal.

3. A cell for a fuel cell, comprising an assembly having a fuel electrode and an air electrode provided on an electrolyte membrane, a first gas diffusion member that supplies a fuel gas to the fuel electrode, a second gas diffusion member that supplies an oxidizing gas to the air electrode, and a pair of separators that sandwich the first gas diffusion member, the assembly, and the second gas diffusion member, wherein:

the cell for a fuel cell has an electric power generation region in which the assembly is positioned, a first manifold region, which is provided at a periphery of the electric power generation region, and in which first manifold openings are formed to allow passage of the fuel gas, and a second manifold region, which is provided at the periphery of the electric power generation region, and in which second manifold openings are formed to allow passage of the oxidizing gas, the first gas diffusion member extends to the first manifold region and is hermetically sealed by impregnation with a liquid resin, the second gas diffusion member extends to the second manifold region and is hermetically sealed by impregnation with a liquid resin, a porosity of a first boundary portion between the electric power generation region and the first manifold region in the first gas diffusion member is smaller than a porosity of the manifold region within the first gas diffusion member, a porosity of a second boundary portion between the electric power generation region and the second manifold region in the second gas diffusion member is smaller than a porosity of the second manifold region within the second gas diffusion member, the separators are flat separators in which a surface that faces the assembly is a flat surface, and the first gas diffusion member and second gas diffusion member are porous passage layers that are disposed between the flat separators and gas diffusion layers provided on the fuel electrode and the air electrode respectively.

4. The cell for a fuel cell according to claim 3, wherein the assembly extends to the first manifold region and/or the second manifold region and is bonded to a liquid resin that forms a hermetic seal.

5. The cell for a fuel cell according to claim 3, wherein a pore size within the first boundary portions of the first gas diffusion member and the second boundary portion of the second gas diffusion member is not more than 20 μm.

6. The cell for a fuel cell according to claim 3, wherein the porous passage layers are formed from a lath cut metal or expanded metal that has different porosities within the electric power generation region, the first and second manifold regions, and the first and second boundary portions between the electric power generation region and the first and second manifold regions.

7. The cell for a fuel cell according to claim 1, wherein within the first and second manifold regions, the first gas diffusion member, the assembly, and the second gas diffusion member are integrated into a single unit, and a gasket is provided that hermetically seals the periphery of the first and second manifold openings, and a first peripheral edge portion of the first gas diffusion member that extends into the first manifold region and/or a second peripheral edge portion of the second gas diffusion member that extends into the second manifold region is positioned centrally across a thickness direction of the gasket.

8. A fuel cell, obtained by stacking the cell for a fuel cell according to claim 1.

9. A fuel cell, obtained by stacking the cell for a fuel cell according to claim 3.

* * * * *